(12) United States Patent
Pike

(10) Patent No.: US 11,010,458 B2
(45) Date of Patent: *May 18, 2021

(54) AUTHENTICATION METHOD AND SYSTEM

(71) Applicants: Licentia Group Limited, Cardiff (GB); MyPinPad Limited, Cardiff (GB)

(72) Inventor: Justin Pike, Blackwood (GB)

(73) Assignees: Licentia Group Limited, Cardiff (GB); MyPinPad Limited, Cardiff (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,158

(22) Filed: Dec. 17, 2019

(65) Prior Publication Data

US 2020/0201960 A1 Jun. 25, 2020

Related U.S. Application Data

(63) Continuation of application No. 15/197,086, filed on Jun. 29, 2016, now Pat. No. 10,565,359, which is a (Continued)

(30) Foreign Application Priority Data

Jul. 20, 2012 (GB) ..................................... 1212878
Apr. 4, 2013 (GB) ..................................... 1306053

(51) Int. Cl.
*G06F 21/31* (2013.01)
*G07F 7/10* (2006.01)
(Continued)

(52) U.S. Cl.
CPC .............. *G06F 21/31* (2013.01); *G06F 21/36* (2013.01); *G06F 21/62* (2013.01); *G07F 7/1033* (2013.01);
(Continued)

(58) Field of Classification Search
CPC .......... G06F 21/31; G06F 21/62; G06F 21/36; G07F 7/1033; G07F 7/1041; G07F 7/1075; G07F 7/1091
(Continued)

(56) References Cited

U.S. PATENT DOCUMENTS 2,819,067 A 1/1958 Dusenbury
3,176,324 A 4/1965 Birgbauer, Sr.
(Continued)

FOREIGN PATENT DOCUMENTS

CN 100583113 C 3/2005
CN 101082948 A 12/2007
(Continued)

OTHER PUBLICATIONS

Ciphercard: A Token-Based Approach Against Camera-Based Shoulder Surfing Attacks on Common Touchscreen Devices Authors: Teddy Seyed; Xing-Dong Yang; Anthony Tang; Saul Greenberg; Jiawei Gubin; Zhuxiang Cao.
(Continued)

*Primary Examiner* — Tae K Kim
*Assistant Examiner* — Peiliang Pan
(74) *Attorney, Agent, or Firm* — Gordon & Jacobson, P.C.

(57) ABSTRACT

The invention provides a computer-implemented authentication method comprising the step of enabling a user to input an identifier (e.g. a PIN) into an electronic device having a screen and a keypad operable within a keypad zone of the screen; by operating at least one key of the keypad via an image of at least part of a scrambled keypad which is displayed at least partially within the keypad zone. The user's operation of the keypad key via the image generates an encoded version of the user's intended input. In one sense the invention can be perceived as superimposing a non-
(Continued)

functional image of a scrambled keyboard over an underlying, functional keypad. The image may be any type of electronic image, and may include a video image. The invention is particularly suited for use with, but not limited to, mobile phones, tablet computer, PCs etc. It can be implemented in any system wherein a user's identity must be verified before access is granted to a controlled resource.

34 Claims, 13 Drawing Sheets

Related U.S. Application Data continuation of application No. 15/094,383, filed on Apr. 8, 2016, now Pat. No. 10,366,215, which is a continuation of application No. 14/416,054, filed as application No. PCT/GB2013/051913 on Jul. 17, 2013, now Pat. No. 9,552,465.

(51) Int. Cl.
   *G06F 21/36* (2013.01)
   *G06F 21/62* (2013.01)
(52) U.S. Cl.
   CPC .......... *G07F 7/1041* (2013.01); *G07F 7/1075* (2013.01); *G07F 7/1091* (2013.01)
(58) Field of Classification Search
   USPC .......................................................... 726/19
   See application file for complete search history.

(56) References Cited

U.S. PATENT DOCUMENTS

| | | | |
|---|---|---|---|
| 3,201,732 A | 8/1965 | Olsen | |
| 3,255,323 A | 6/1966 | Austin | |
| 3,270,720 A | 9/1966 | Ehrhardt | |
| 3,347,103 A | 10/1967 | High | |
| 3,364,601 A | 1/1968 | Korenek | |
| 3,375,428 A | 3/1968 | Mitchell | |
| 3,392,846 A | 7/1968 | Getzin | |
| 3,413,071 A | 11/1968 | Davis | |
| 3,621,242 A | 11/1971 | Ferguson | |
| 3,762,876 A | 10/1973 | Koehler | |
| 3,965,066 A | 6/1976 | Sterman | |
| 5,193,152 A | 3/1993 | Smith | |
| 5,209,102 A | 5/1993 | Wang | |
| 5,219,794 A | 6/1993 | Satoh | |
| 5,234,389 A | 8/1993 | Goates | |
| 5,257,486 A | 11/1993 | Holmwall | |
| 5,363,449 A | 11/1994 | Bestock | |
| 5,434,702 A | 7/1995 | Byron | |
| 5,504,808 A | 4/1996 | Hamrick, Jr. | |
| 5,549,194 A | 8/1996 | Dag | |
| 5,715,078 A | 2/1998 | Shiraishi | |
| 5,754,652 A | 5/1998 | Wilfong | |
| 5,949,348 A | 9/1999 | Kapp | |
| 5,990,586 A | 11/1999 | Milano, Jr. | |
| 6,193,152 B1 | 2/2001 | Fernando | |
| 6,209,102 B1 | 3/2001 | Hoover | |
| 6,219,794 B1 | 4/2001 | Soutar | |
| 6,234,389 B1 | 5/2001 | Valliani | |
| 6,257,486 B1 | 7/2001 | Teicher | |
| 6,434,702 B1 | 8/2002 | Maddalozzo, Jr. | |
| 6,549,194 B1 | 4/2003 | McIntyre | |
| 6,630,928 B1 | 10/2003 | McIntyre | |
| 6,671,405 B1 | 12/2003 | Savakis | |
| 6,715,078 B1 | 3/2004 | Chasko | |
| 6,990,586 B1 | 1/2006 | Tresser | |
| 7,003,316 B1 | 2/2006 | Elias | |
| 7,010,806 B2 | 3/2006 | Bender | |
| 7,047,222 B1 | 5/2006 | Bush | |
| 7,091,845 B2 | 8/2006 | Midland | |
| 7,092,915 B2 | 8/2006 | Best | |
| 7,243,237 B2 | 7/2007 | Peinado | |
| 7,305,565 B1 | 12/2007 | Lungaro | |
| 7,395,506 B2 | 7/2008 | Tan | |
| 7,698,563 B2 | 4/2010 | Shin | |
| 7,735,121 B2 | 6/2010 | Madani | |
| 7,992,007 B2 | 8/2011 | Lazzaro | |
| 8,117,458 B2 | 2/2012 | Osborn, III | |
| 8,176,324 B1 | 5/2012 | Krishnamurthy | |
| 8,201,732 B1 | 6/2012 | Kropf | |
| 8,255,323 B1 | 8/2012 | Casey | |
| 8,270,720 B1 | 9/2012 | Ladd | |
| 8,297,173 B1 | 10/2012 | Teetzel | |
| 8,347,103 B2 | 1/2013 | Jones | |
| 8,364,601 B2 | 1/2013 | Dewan | |
| 8,375,428 B2 | 2/2013 | Won | |
| 8,392,846 B2 | 3/2013 | Carapelli | |
| 8,413,071 B2 | 4/2013 | Kim | |
| 8,453,027 B2 | 5/2013 | Bartz | |
| 8,453,207 B1 * | 5/2013 | White | G06F 21/40 726/2 |
| 8,621,242 B2 | 12/2013 | Brown | |
| 8,762,876 B2 | 6/2014 | Puppin | |
| 8,965,066 B1 | 2/2015 | Derakhshani | |
| 9,082,253 B1 | 7/2015 | Harty | |
| 9,235,967 B1 | 1/2016 | Magee | |
| 9,552,465 B2 | 1/2017 | Pike | |
| 9,576,411 B2 | 2/2017 | Kim | |
| 10,108,796 B2 | 10/2018 | Lo | |
| 10,366,215 B2 | 7/2019 | Pike | |
| 2002/0016918 A1 | 2/2002 | Tucker | |
| 2002/0023215 A1 | 2/2002 | Wang | |
| 2002/0029342 A1 | 3/2002 | Keech | |
| 2002/0046185 A1 | 4/2002 | Villart | |
| 2002/0082962 A1 | 6/2002 | Farris | |
| 2002/0123972 A1 | 9/2002 | Hodgson | |
| 2002/0129250 A1 | 9/2002 | Kimura | |
| 2002/0188872 A1 | 12/2002 | Willeby | |
| 2003/0002667 A1 | 1/2003 | Gougeon | |
| 2003/0004877 A1 | 1/2003 | Kasasaku | |
| 2003/0120612 A1 | 6/2003 | Fujisawa | |
| 2003/0120936 A1 | 6/2003 | Farris | |
| 2003/0132918 A1 | 7/2003 | Fitch | |
| 2003/0212327 A1 | 11/2003 | Wang | |
| 2003/0229597 A1 | 12/2003 | De Jong | |
| 2003/0229598 A1 | 12/2003 | De Jong | |
| 2003/0229791 A1 | 12/2003 | De Jong | |
| 2004/0010690 A1 | 1/2004 | Shin | |
| 2004/0039933 A1 | 2/2004 | Martin | |
| 2004/0044739 A1 | 3/2004 | Ziegler | |
| 2004/0073809 A1 | 4/2004 | Wing Keong | |
| 2004/0122768 A1 | 6/2004 | Creamer | |
| 2004/0122771 A1 | 6/2004 | Celi | |
| 2004/0182921 A1 | 9/2004 | Dickson | |
| 2005/0010786 A1 | 1/2005 | Michener | |
| 2005/0012715 A1 | 1/2005 | Ford | |
| 2005/0036611 A1 | 2/2005 | Seaton | |
| 2005/0043997 A1 | 2/2005 | Sahota | |
| 2005/0075973 A1 | 4/2005 | Yousofi | |
| 2005/0127156 A1 | 6/2005 | Yoo | |
| 2005/0127158 A1 | 6/2005 | Figueras | |
| 2005/0140832 A1 | 6/2005 | Goldman | |
| 2005/0144449 A1 | 6/2005 | Voice | |
| 2005/0146447 A1 | 7/2005 | Na | |
| 2005/0177522 A1 | 8/2005 | Williams | |
| 2005/0193208 A1 | 9/2005 | Charrette, III | |
| 2005/0212763 A1 | 9/2005 | Okamura | |
| 2006/0003706 A1 | 1/2006 | Welland | |
| 2006/0017691 A1 | 1/2006 | Cruz-Hernandez | |
| 2006/0018467 A1 | 1/2006 | Steinmetz | |
| 2006/0026440 A1 | 2/2006 | Sauvebois | |
| 2006/0032705 A1 | 2/2006 | Isham | |
| 2006/0037067 A1 | 2/2006 | Morris | |
| 2006/0053301 A1 | 3/2006 | Shin | |
| 2006/0104446 A1 | 5/2006 | Varghese | |
| 2006/0133597 A1 | 6/2006 | Song | |
| 2006/0136334 A1 | 6/2006 | Atkinson | |
| 2006/0146169 A1 | 7/2006 | Segman | |
| 2006/0149845 A1 | 7/2006 | Malin | |

(56) References Cited

U.S. PATENT DOCUMENTS

| | | |
|---|---|---|
| 2006/0155619 A1 | 7/2006 | Rhiando |
| 2006/0182715 A1 | 8/2006 | Sandrock |
| 2006/0206919 A1 | 9/2006 | Montgomery |
| 2006/0221059 A1 | 10/2006 | Choi |
| 2006/0247533 A1 | 11/2006 | Abe |
| 2007/0005500 A1 | 1/2007 | Steeves |
| 2007/0014415 A1 | 1/2007 | Harrison |
| 2007/0073937 A1* | 3/2007 | Feinberg ............... G06F 12/02 710/62 |
| 2007/0089164 A1 | 4/2007 | Gao |
| 2007/0101150 A1 | 5/2007 | Oda |
| 2007/0110224 A1 | 5/2007 | Gumpel |
| 2007/0182715 A1 | 8/2007 | Fyke |
| 2007/0209014 A1 | 9/2007 | Youmtoub |
| 2007/0213090 A1 | 9/2007 | Holmberg |
| 2007/0279391 A1 | 12/2007 | Marttila |
| 2007/0282756 A1 | 12/2007 | Dravenstott |
| 2008/0011098 A1 | 1/2008 | Herremans |
| 2008/0014818 A1 | 1/2008 | Privitera |
| 2008/0110981 A1* | 5/2008 | DeLine ............... G07F 13/025 235/381 |
| 2008/0148186 A1 | 6/2008 | Krishnamurthy |
| 2008/0165035 A1 | 7/2008 | Bhella |
| 2008/0168546 A1 | 7/2008 | Almeida |
| 2008/0172735 A1 | 7/2008 | Gao |
| 2008/0184036 A1 | 7/2008 | Kavsan |
| 2008/0209223 A1 | 8/2008 | Nandy |
| 2008/0251969 A1 | 10/2008 | Isham |
| 2008/0280652 A1 | 11/2008 | Marry |
| 2008/0289035 A1 | 11/2008 | Delia |
| 2008/0306995 A1 | 12/2008 | Newell |
| 2008/0319902 A1 | 12/2008 | Chazan |
| 2009/0033522 A1 | 2/2009 | Skillman |
| 2009/0044282 A1 | 2/2009 | Govindaraju |
| 2009/0066660 A1 | 3/2009 | Ure |
| 2009/0067627 A1 | 3/2009 | Hogl |
| 2009/0077383 A1 | 3/2009 | De Monseignat |
| 2009/0106827 A1 | 4/2009 | Cerruti |
| 2009/0183098 A1 | 7/2009 | Casparian |
| 2009/0193210 A1 | 7/2009 | Hewett |
| 2009/0213132 A1 | 8/2009 | Kargman |
| 2009/0235199 A1 | 9/2009 | Mastie |
| 2009/0254986 A1 | 10/2009 | Harris |
| 2009/0270078 A1 | 10/2009 | Nam |
| 2009/0277968 A1 | 11/2009 | Walker |
| 2009/0328197 A1 | 12/2009 | Newell |
| 2010/0036783 A1 | 2/2010 | Rodriguez |
| 2010/0049768 A1 | 2/2010 | Robert |
| 2010/0098300 A1 | 4/2010 | Otto |
| 2010/0109920 A1 | 5/2010 | Spradling |
| 2010/0117792 A1 | 5/2010 | Faith |
| 2010/0121737 A1 | 5/2010 | Yoshida |
| 2010/0125509 A1 | 5/2010 | Kranzley |
| 2010/0138666 A1 | 6/2010 | Adams |
| 2010/0149100 A1 | 6/2010 | Meiby |
| 2010/0153270 A1 | 6/2010 | Hawkes |
| 2010/0174653 A1 | 7/2010 | Tian |
| 2010/0175016 A1 | 7/2010 | Tian |
| 2010/0180336 A1 | 7/2010 | Jones |
| 2010/0182244 A1 | 7/2010 | Onda |
| 2010/0186076 A1 | 7/2010 | Ali |
| 2010/0215270 A1 | 8/2010 | Manohar |
| 2010/0223663 A1 | 9/2010 | Morimoto |
| 2010/0242104 A1 | 9/2010 | Wankmueller |
| 2010/0259561 A1 | 10/2010 | Forutanpour |
| 2010/0287097 A1 | 11/2010 | Treadwell |
| 2010/0287382 A1 | 11/2010 | Gyorffy |
| 2010/0306283 A1 | 12/2010 | Johnson |
| 2010/0323617 A1 | 12/2010 | Hubinak |
| 2011/0004769 A1 | 1/2011 | Won |
| 2011/0018033 A1 | 1/2011 | Takenaka |
| 2011/0020414 A1 | 1/2011 | Kunin |
| 2011/0055084 A1 | 3/2011 | Singh |
| 2011/0090097 A1 | 4/2011 | Beshke |
| 2011/0109567 A1 | 5/2011 | Kim |
| 2011/0144586 A1 | 6/2011 | Michaud |
| 2011/0180336 A1 | 7/2011 | Kurata |
| 2011/0185313 A1 | 7/2011 | Harpaz |
| 2011/0185319 A1 | 7/2011 | Carapelli |
| 2011/0191591 A1 | 8/2011 | Cheng |
| 2011/0191856 A1 | 8/2011 | Keen |
| 2011/0199387 A1 | 8/2011 | Newton |
| 2011/0204140 A1 | 8/2011 | Hart |
| 2011/0246369 A1 | 10/2011 | De Oliveira |
| 2011/0281630 A1 | 11/2011 | Omar |
| 2011/0310019 A1 | 12/2011 | Wilson |
| 2011/0313871 A1 | 12/2011 | Greenwood |
| 2011/0321138 A1 | 12/2011 | Kruger |
| 2012/0042365 A1 | 2/2012 | Shoval |
| 2012/0047564 A1 | 2/2012 | Liu |
| 2012/0079273 A1 | 3/2012 | Bacchiaz |
| 2012/0095867 A1 | 4/2012 | McKelvey |
| 2012/0096277 A1 | 4/2012 | Perez Soria |
| 2012/0098750 A1 | 4/2012 | Allen |
| 2012/0132705 A1 | 5/2012 | Golueke Peter |
| 2012/0158672 A1 | 6/2012 | Oltean |
| 2012/0159160 A1 | 6/2012 | Poisner |
| 2012/0159582 A1 | 6/2012 | Griffin |
| 2012/0159583 A1 | 6/2012 | Griffin |
| 2012/0159592 A1 | 6/2012 | Griffin |
| 2012/0159593 A1 | 6/2012 | Griffin |
| 2012/0159594 A1 | 6/2012 | Griffin |
| 2012/0159609 A1 | 6/2012 | Griffin |
| 2012/0159613 A1 | 6/2012 | Griffin |
| 2012/0159614 A1 | 6/2012 | Griffin |
| 2012/0159616 A1 | 6/2012 | Griffin |
| 2012/0162086 A1 | 6/2012 | Rhee |
| 2012/0185398 A1 | 7/2012 | Weis |
| 2012/0222100 A1 | 8/2012 | Fisk |
| 2012/0222102 A1 | 8/2012 | Hirose |
| 2012/0249295 A1 | 10/2012 | Yeung |
| 2012/0253971 A1 | 10/2012 | Bansal |
| 2012/0256723 A1 | 10/2012 | Grover |
| 2012/0260326 A1 | 10/2012 | Steigmann |
| 2012/0291120 A1 | 11/2012 | Griffin |
| 2012/0305648 A1 | 12/2012 | Sondhi |
| 2012/0311723 A1 | 12/2012 | Britt, Jr. |
| 2012/0313858 A1 | 12/2012 | Park |
| 2012/0323788 A1 | 12/2012 | Keresman, III |
| 2013/0018800 A1 | 1/2013 | Devaraju |
| 2013/0019320 A1 | 1/2013 | Ericsson |
| 2013/0020389 A1 | 1/2013 | Barnett |
| 2013/0021233 A1 | 1/2013 | Umminger |
| 2013/0023240 A1 | 1/2013 | Weiner |
| 2013/0026513 A1 | 1/2013 | Aurongzeb |
| 2013/0029824 A1 | 1/2013 | De Koning |
| 2013/0042318 A1 | 2/2013 | Thatha |
| 2013/0047237 A1 | 2/2013 | Ahn |
| 2013/0050088 A1 | 2/2013 | Smith |
| 2013/0060739 A1 | 3/2013 | Kalach |
| 2013/0078951 A1 | 3/2013 | Mun |
| 2013/0086382 A1 | 4/2013 | Barnett |
| 2013/0091583 A1 | 4/2013 | Karroumi |
| 2013/0106690 A1 | 5/2013 | Lim |
| 2013/0117573 A1 | 5/2013 | Harbige |
| 2013/0148044 A1 | 6/2013 | Ohyama |
| 2013/0154937 A1 | 6/2013 | Park |
| 2013/0154981 A1 | 6/2013 | Park |
| 2013/0198459 A1 | 8/2013 | Joshi |
| 2013/0207902 A1 | 8/2013 | Showering |
| 2013/0232549 A1 | 9/2013 | Hawkes |
| 2013/0265136 A1 | 10/2013 | Wadia |
| 2013/0298246 A1 | 11/2013 | Cragun |
| 2013/0301830 A1 | 11/2013 | Bar-El |
| 2014/0002558 A1 | 1/2014 | Ramesh |
| 2014/0013252 A1 | 1/2014 | Ehrler |
| 2014/0025580 A1 | 1/2014 | Bacastow |
| 2014/0096201 A1 | 4/2014 | Gupta |
| 2014/0162598 A1 | 6/2014 | Villa-Real |
| 2014/0168083 A1 | 6/2014 | Ellard |
| 2014/0173492 A1 | 6/2014 | Yoon |
| 2014/0195429 A1 | 7/2014 | Paulsen |
| 2014/0283022 A1 | 9/2014 | Beloncik |
| 2014/0310531 A1 | 10/2014 | Kundu |

(56) References Cited

U.S. PATENT DOCUMENTS

| | | |
|---|---|---|
| 2014/0324698 A1 | 10/2014 | Dolcino |
| 2014/0324708 A1 | 10/2014 | McCauley |
| 2015/0095241 A1 | 4/2015 | Edwards |
| 2015/0116225 A1 | 4/2015 | Luo |
| 2015/0154414 A1 | 6/2015 | Pike |
| 2015/0154598 A1 | 6/2015 | Forte |
| 2015/0261968 A1 | 9/2015 | Polyachenko |
| 2015/0332038 A1 | 11/2015 | Ramsden |
| 2015/0347774 A1 | 12/2015 | Krstic |
| 2015/0350163 A1 | 12/2015 | Brander |
| 2015/0371213 A1 | 12/2015 | Pike |
| 2015/0379288 A1 | 12/2015 | Kubik |
| 2016/0006718 A1 | 1/2016 | Huxham |
| 2016/0034718 A1 | 2/2016 | Mizrachi |
| 2016/0042190 A1 | 2/2016 | Adderly |
| 2016/0063230 A1 | 3/2016 | Alten |
| 2016/0065546 A1 | 3/2016 | Krishna |
| 2016/0125193 A1 | 5/2016 | Dai Zovi |
| 2016/0154980 A1 | 6/2016 | Neumann |
| 2016/0224771 A1 | 8/2016 | Pike |
| 2016/0246955 A1 | 8/2016 | Jiang |
| 2016/0253508 A1 | 9/2016 | Song |
| 2016/0283013 A1 | 9/2016 | Engstrom |
| 2016/0314293 A1 | 10/2016 | Pike |
| 2016/0314468 A1 | 10/2016 | Smith |
| 2016/0320965 A1 | 11/2016 | Chung |
| 2016/0337857 A1 | 11/2016 | Carron |
| 2017/0006140 A1 | 1/2017 | Park |
| 2017/0061138 A1 | 3/2017 | Lambert |
| 2017/0061408 A1 | 3/2017 | Choi |
| 2017/0140354 A1 | 5/2017 | Jenkins |
| 2017/0192670 A1 | 7/2017 | Raman |
| 2017/0235926 A1 | 8/2017 | Fyke |
| 2017/0270764 A1 | 9/2017 | Riedel |
| 2018/0032831 A1 | 2/2018 | Kim |
| 2018/0150623 A1 | 5/2018 | Pike |
| 2018/0150628 A1 | 5/2018 | Pike |
| 2018/0150629 A1 | 5/2018 | Pike |
| 2018/0150630 A1 | 5/2018 | Pike |
| 2018/0374392 A1 | 12/2018 | Ollivier |
| 2020/0005273 A1 | 1/2020 | Pike |
| 2020/0201960 A1 | 6/2020 | Pike |
| 2020/0210557 A1 | 7/2020 | Pike |
| 2020/0226235 A1 | 7/2020 | Pike |

FOREIGN PATENT DOCUMENTS

| | | |
|---|---|---|
| CN | 101126967 A | 2/2008 |
| CN | 201035502 Y | 3/2008 |
| CN | 201111222 Y | 9/2008 |
| CN | 202150070 U | 2/2012 |
| CN | 105956857 A | 9/2016 |
| CN | 106022172 A | 10/2016 |
| DE | 4129202 | 3/1993 |
| DE | 4129202 A1 | 3/1993 |
| DE | 19803339 A1 | 8/1999 |
| DE | 10100188 | 7/2002 |
| DE | 10306352 A1 | 9/2004 |
| DE | 102008050609 A1 | 10/2009 |
| DE | 102008056605 A1 | 5/2010 |
| DE | 102009022845 | 9/2010 |
| DE | 102009022845 A1 | 9/2010 |
| DE | 102009023925 A1 | 12/2010 |
| DE | 102010022368 A1 | 12/2011 |
| EP | 0432409 A1 | 6/1991 |
| EP | 0662665 A2 | 7/1995 |
| EP | 0870222 A2 | 10/1998 |
| EP | 1161060 | 12/2001 |
| EP | 1161060 A1 | 12/2001 |
| EP | 1599786 A2 | 11/2005 |
| EP | 1600847 A1 | 11/2005 |
| EP | 1615181 A1 | 1/2006 |
| EP | 1742450 | 1/2007 |
| EP | 1840778 A1 | 10/2007 |
| EP | 2141647 | 1/2010 |
| EP | 2141647 A1 | 1/2010 |
| EP | 2365469 | 9/2011 |
| EP | 2400426 A1 | 12/2011 |
| EP | 2458491 | 5/2012 |
| EP | 2458491 A2 | 5/2012 |
| EP | 2466512 A1 | 6/2012 |
| EP | 2466513 A1 | 6/2012 |
| EP | 2466514 A1 | 6/2012 |
| EP | 2466515 A1 | 6/2012 |
| EP | 2466516 A1 | 6/2012 |
| EP | 2466517 A1 | 6/2012 |
| EP | 2466518 A1 | 6/2012 |
| EP | 2466519 A1 | 6/2012 |
| EP | 2466520 A1 | 6/2012 |
| EP | 2466521 A1 | 6/2012 |
| EP | 2487620 A1 | 8/2012 |
| EP | 2512090 A1 | 10/2012 |
| EP | 2523137 A1 | 11/2012 |
| EP | 2775421 | 9/2014 |
| EP | 3163926 A1 | 5/2017 |
| EP | 3176722 A1 | 6/2017 |
| EP | 3355512 A1 | 8/2018 |
| FR | 2622322 | 4/1989 |
| FR | 2810067 | 12/2001 |
| FR | 2812423 A1 | 2/2002 |
| FR | 2819067 | 7/2002 |
| FR | 2923034 A1 | 5/2009 |
| FR | 2961330 A1 | 12/2011 |
| FR | 2969342 A1 | 6/2012 |
| GB | 1995271884 | 10/1995 |
| GB | 2387702 A | 10/2003 |
| GB | 2388229 A | 11/2003 |
| GB | 2389693 A | 12/2003 |
| GB | 2402649 A | 12/2004 |
| GB | 2416058 | 1/2006 |
| GB | 2416058 A | 1/2006 |
| GB | 2427059 A | 12/2006 |
| GB | 2438886 A | 12/2007 |
| GB | 2454459 A | 5/2009 |
| GB | 2457733 | 8/2009 |
| GB | 2457733 A | 8/2009 |
| GB | 2520207 A | 5/2015 |
| GB | 2542512 | 3/2017 |
| GB | 2556474 | 5/2018 |
| JP | 2000099801 A | 4/2000 |
| JP | 2000165378 | 6/2000 |
| JP | 2003346098 | 12/2003 |
| JP | 2003346098 A | 12/2003 |
| JP | 2004102460 | 4/2004 |
| JP | 2005107678 | 4/2005 |
| JP | 2006243938 A | 9/2006 |
| JP | 2008506198 | 2/2008 |
| JP | 2008204409 A | 9/2008 |
| JP | 2008537210 | 9/2008 |
| JP | 2009199581 A | 9/2009 |
| JP | 2009237774 A | 10/2009 |
| JP | 2010126913 A | 6/2010 |
| JP | 2010533925 | 10/2010 |
| JP | 2012138011 A | 7/2012 |
| JP | 2012194648 A | 10/2012 |
| KR | 20090130455 A | 12/2009 |
| KR | 101520803 | 5/2015 |
| KR | 20180056116 A | 5/2018 |
| WO | 9311551 | 6/1993 |
| WO | 9705578 | 2/1997 |
| WO | 0025474 A1 | 5/2000 |
| WO | 0146922 | 6/2001 |
| WO | 0146922 A1 | 6/2001 |
| WO | 02071177 A2 | 9/2002 |
| WO | 03058947 | 7/2003 |
| WO | 03058947 A1 | 7/2003 |
| WO | 03058947 A2 | 7/2003 |
| WO | 2005104428 | 11/2005 |
| WO | 2005104428 A2 | 11/2005 |
| WO | 2006010058 | 1/2006 |
| WO | 2006064241 A2 | 6/2006 |
| WO | 2006095203 | 9/2006 |
| WO | 2007056746 | 5/2007 |
| WO | 2007143740 | 12/2007 |

(56) References Cited

FOREIGN PATENT DOCUMENTS

| WO | 2007143740 | A2 | 12/2007 |
| --- | --- | --- | --- |
| WO | 2009000223 | A2 | 12/2008 |
| WO | 2009009788 | | 1/2009 |
| WO | 2009009788 | A1 | 1/2009 |
| WO | 2009012326 | | 1/2009 |
| WO | 2009130985 | | 10/2009 |
| WO | 2010131218 | | 11/2010 |
| WO | 2010131218 | A1 | 11/2010 |
| WO | 2010134808 | | 11/2010 |
| WO | 2011093998 | A1 | 8/2011 |
| WO | 2011155915 | | 12/2011 |
| WO | 2011155915 | A1 | 12/2011 |
| WO | 12009334 | A1 | 1/2012 |
| WO | 2012004395 | A1 | 1/2012 |
| WO | 2012077098 | A1 | 6/2012 |
| WO | 2012131420 | A1 | 10/2012 |
| WO | 2012146587 | A1 | 11/2012 |
| WO | 2013013192 | | 1/2013 |
| WO | 2013021233 | | 2/2013 |
| WO | 2013148044 | | 10/2013 |
| WO | 2014013252 | A2 | 1/2014 |
| WO | 2014111689 | A1 | 7/2014 |
| WO | 2014132193 | | 9/2014 |
| WO | 2015055973 | | 4/2015 |
| WO | 2015063474 | | 5/2015 |
| WO | 2016046458 | A1 | 3/2016 |
| WO | 2016048236 | | 3/2016 |
| WO | 2016189325 | A1 | 12/2016 |
| WO | 2017065576 | A1 | 4/2017 |
| WO | 2017190561 | A1 | 11/2017 |

OTHER PUBLICATIONS

Japanese Office Action dated Sep. 8, 2020 of application No. 2017-561754.
Scramblepad, Scrambleprox, Scramblesmart, Scramblesmartprox Author: Hirsch Electronics Date: Jul. 27, 2013.
Search Report dated Jul. 22, 2020 of GB application No. GB1916441.7, 2 pages.
Touch Screen Remote Arming Station (RAS) Author: Tecom Date: Mar. 18, 2015.
Anonymous, "Fujitsu Develops World's First Authentication Technology to Extract and Match 2,048-bit Feature Codes from Palm Vein Images", Fujitsu Global, Kawasaki, Japan, (Aug. 5, 2013), URL: http://www.fujitsu.com/global/about/resources/news/press-releases/2013/0805-01.h tml, (Aug. 1, 2016), XP055292505, 4 pages.
Decision to Grant for related GB2520207 dated Dec. 8, 2015. 2 pages.
Examination Report of Application No. GB1619853.3 dated Mar. 8, 2017. 3 pages.
Examination Report of Indian Application No. 2301/KOLNP/2015 dated Oct. 18, 2019. 5 pages.
https://patentscope.wipo.int/search/en/detail.jsf?docId=WO2011116570&tab=PCTBIBLIO&maxRec=1000 (Year: 2010), 4 pages.
https://patentscope.wipo.int/search/en/detail.jsf?docId=WO2016188127&tab=PCTBIBLIO&maxRec=1000 (Year: 2015), 6 pages.
International Search Report and Written Opinion of International Application No. PCT/GB2016/051548 dated Aug. 8, 2016, 10 pages.
International Search Report and Written Opinion of International Application No. PCT/GB2016/051549 dated Aug. 10, 2016, 11 pages.
International Search Report and Written Opinion of International Application No. PCT/GB2016/051550 dated Aug. 8, 2016, 10 pages.
International Search Report and Written Opinion of International Application No. PCT/GB2016/051553 dated Aug. 4, 2016, 9 pages.
International Search Report in related PCT Application No. PCT/GB2013/051913 dated Feb. 6, 2014. 6 pages.
Roos, "Automatically Downloading My ING Direct Transactions-Chris Roos", Jun. 23, 2007, XP055085833. 7 pages.
Search and Examination Report of Application No. GB1906165.4 dated Aug. 23, 2019, 5 pages.
Search Report cited in Office Action dated Nov. 26, 2019 of Russian Application No. 2017141194/08, 2 pages.
Search Report in related GB Application No. GB1212878.1 dated Dec. 3, 2012. 4 pages.
Search Report issued by United Kingdom Intellectual Property Office dated Oct. 6, 2017 for Application No. GB1321505.8, 3 pages.
The Usability of Picture Passwords, Fraser, Jul. 23, 2014, 11 pages.
Translation of Office Action dated Nov. 26, 2019 of Russian Application No. 2017141194/08, 6 pages.
Using Biometrics to Generate Public and Private Keys, Satrugna Pakala, (May 31, 2006) Retrieved from internet; URL: http://www.sci.tamucc.edu/~cams/GraduateProjects/view. php? view=266, 50 pages.
Written Opinion of the Intl Searching Authority in related PCT Application No. PCT/GB2013/051913, 201 , dated Jan. 20, 2015, 11 pages.
Australian Office Action dated Jan. 18, 2021 of application No. 2016269268.
Chinese Office Action dated Dec. 3, 2020 of Application No. 201680039203.9.
EyeDecrypt—Private Interactions in plain Sight, Forte et al., Proc. 9th Conference on Security and Cryptography for Networks (SCN 2014).
GlobalPlatform Device Technology Trusted User Interface API, Version 1.0, Jun. 2013, Document Reference: GPD_SPE_020.
Indian Office Action dated Feb. 1, 2021 of application No. 20173704209.
Indian Office Action dated Jan. 21, 2021 of application No. 201737042169.
PCI Mobile Payment Acceptance Security Guidelines for Developers, Version 1.0, Emerging Technologies, PCI Security Standards Council, Sep. 2012.
PCI Mobile Payment Acceptance Security Guidelines for Merchants as End-Users, Version 1.0, Emerging Technologies, PCI Security Standards Council, Feb. 2013.
Secure Mobile Payment on NFC-Enabled Mobile Phones Formally Analysed Using CasperFDR, S. Abughazalah et al, 2014 IEEE 13th International Conference on Trust, Security and Privacy in Computing and Communications, pp. 422-431.
Thales e-Security mPOS Secure Mobile Card Acceptance White Paper, Nov. 2013.

* cited by examiner

When the user now presses the PIN Pad i.e. the virtual PIN Pad, the following numbers are displayed:

| Key Press | Output |
|---|---|
| 1 | 5 |
| 2 | 7 |
| 3 | 2 |
| 4 | 3 |
| 5 | 6 |
| 6 | 0 |
| 7 | 4 |
| 8 | 9 |
| 9 | 8 |
| 0 | 1 |

|   |   |   |
|---|---|---|
| 6 | 3 | 4 |
| 5 | 0 | 1 |
| 7 | 2 | 8 |
| < | 9 | > |

Top PinPad

FIG. 16A

|   |   |   |
|---|---|---|
| 3 | 1 | 5 |
| 6 | 7 | 9 |
| 0 | 4 | 8 |
| < | 2 | > |

Bottom PinPad

FIG. 16B

|   |   |   |
|---|---|---|
| 0 | 7 | 4 |
| 6 | 1 | 8 |
| 9 | 3 | 5 |
| < | 2 | > |

2nd PinPad

FIG. 16C

|   |   |   |
|---|---|---|
| 0 | 3 | 4 |
| 7 | 1 | 5 |
| 6 | 2 | 8 |
| < | 9 | > |

3rd PinPad

FIG. 16D

|   |   |   |
|---|---|---|
| 2 | 5 | 8 |
| 1 | 6 | 7 |
| 3 | 9 | 0 |
| < | 4 | > |

4th PinPad

Licentia

Licentia

Licentia

FIG. 18

| Array Position | 1 | 2 | 3 | 4 | 5 | 6 | 7 | 8 | 9 | 0 |
|---|---|---|---|---|---|---|---|---|---|---|
| Filename Character | 0 | 3 | 4 | 7 | 1 | 5 | 2 | 9 | 8 | 6 |

FIG. 20A

| Array Position | 1 | 2 | 3 | 4 | 5 | 6 | 7 | 8 | 9 | 0 |
|---|---|---|---|---|---|---|---|---|---|---|
| Filename Character | 0 | 3 | 4 | 7 | 1 | 5 | 2 | 9 | 8 | 6 |

FIG. 20B

| Array Position | 1 | 2 | 3 | 4 | 5 | 6 | 7 | 8 | 9 | 0 |
|---|---|---|---|---|---|---|---|---|---|---|
| Filename Character | 0 | 3 | 4 | 7 | 1 | 5 | 2 | 9 | 8 | 6 |

FIG. 20C

| Array Position | 1 | 2 | 3 | 4 | 5 | 6 | 7 | 8 | 9 | 0 |
|---|---|---|---|---|---|---|---|---|---|---|
| Filename Character | 0 | 3 | 4 | 7 | 1 | 5 | 2 | 9 | 8 | 6 |

FIG. 20D

| Array Position | 1 | 2 | 3 | 4 | 5 | 6 | 7 | 8 | 9 | 0 |
|---|---|---|---|---|---|---|---|---|---|---|
| Filename Character | 0 | 3 | 4 | 7 | 1 | 5 | 2 | 9 | 8 | 6 |

FIG. 20E

AUTHENTICATION METHOD AND SYSTEM

CROSS-REFERENCE TO RELATED APPLICATIONS

The present application is a continuation of U.S. Non-Provisional patent application Ser. No. 15/197,086, filed on Jun. 29, 2016, which is a continuation of U.S. Non-Provisional patent application Ser. No. 15/094,383, filed on Apr. 8, 2016, now U.S. Pat. No. 10,366,215, which is a continuation of U.S. Non-Provisional patent application Ser. No. 14/416,054, filed on Jan. 20, 2015, now U.S. Pat. No. 9,552,465, which is a national stage of International Patent Application No. PCT/GB2013/051913 filed on Jul. 17, 2013, and which claims priority to UK Patent Applications No. GB1306053.8 filed on Apr. 4, 2013, and No. GB1212878.1 filed on Jul. 20, 2012, all of which are herein incorporated by reference in their entireties.

BACKGROUND

1. Field

This invention relates generally to the field of user authentication, and more particularly to the field of PIN-based verification. The invention is suited for use in situations where a user is required to enter a code, such as a Personal Identification Number (PIN), which is validated prior to completing an operation. The operation might be any type of operation.

2. State of the Art

Authentication is a technique used in a variety of situations where an individual's identity and/or authorisation needs to be verified prior to being allowed to perform an act or gain access to some controlled or managed resource such as a device, building, a computer system, a financial account, a service etc.

One common approach to authentication is to record some pre-selected identifier (such as a code or combination of symbols) which is then maintained in secrecy in a secure location and available only to authorised parties. The identifier is stored in association with a particular user or group of users, and may sometimes be stored and/or used in conjunction with another pre-determined identifier such as a username, for example. The identifier is often selected by the user himself although sometimes it may be the resource manager or owner who determines it. The user may, in many cases, be able to change their previously selected identifier. Often, the identifier is chosen when the user initially joins an organisation; for example, when he begins employment at a certain company, or registers with a provider for a certain service. After the identifier has been selected and assigned to an authorised individual, that user is required to supply the pre-determined identifier each time he requests permission to perform the controlled act or gain access to the resource or service. The user's inputted identifier is compared with the stored version. If the user is able to supply the correct identifier then his identity is deemed to have been verified and access is granted. If, on the other hand, the correct identifier is not supplied then access is denied.

In this document such an identifier may be referred to as a Personal Identification Code (PIC). One common example of a PIC is a 4 digit numeric code typically referred to as a Personal Identification Number (PIN). The term 'PIC' is intended to include the term 'PIN' (Personal Identification Number). However, other codes of different lengths and containing different types of characters or symbols may be used. The present invention is not intended to be limited with regard to the length of the identifier used, or the type of characters it contains. For example, it may contain numeric digits, alphabetical characters, pictures, punctuation or any other kind of symbol, or a mixture thereof. The term 'PIN' or 'PIC' may be used hereinafter to refer to the user's identifier for the sake of convenience but should not be construed as being limiting in any way as to the length, type or format of the identifier.

PIN-based verification systems typically comprise a keypad which enables the user to enter their pre-selected PIN. A typical keypad layout known in the art is shown in FIG. 14a. A keypad is a set of buttons or 'keys' arranged in a block or 'pad'. The keys are set out in a grid adjacent one another to form the pad. The keys have indicia (identifiers) printed, engraved, embossed or otherwise displayed on them. The indicia on a key typically consists of one symbol e.g. '6' but could comprise more than one symbol e.g. 'AB'.

The indicia on the keys are usually arranged in an ordered manner, such as a sequential series. For example, numeric digits would typically be ordered in ascending order. In this document, the term 'keypad' may be used interchangeably with the term 'pinpad'.

Keypads are often found on alphanumeric keyboards connected to computing devices. Other devices such as calculators, push-button telephones, combination locks, and digital door locks are also known to comprise a keypad. The advent of portable telecommunications and computing devices has also seen keypads introduced into mobile devices such as mobile (cellular) telephones, tablet computers, PDAs and so on.

Many electronic devices now include computer processing capabilities and a touch screen interface capable of displaying a keypad. These may be used for a variety of purposes, including allowing an authorised user to 'unlock' the device by entering a passcode comprising a combination of pre-selected symbols, or entering a telephone number so as to make a call. Card-reading terminals used in financial transactions also have keypads to allow the user to enter his PIN via the keypad.

Each type of smart phone (e.g. brand and/or model) may have a particular style of keypad associated with it as its 'default' keypad. For example, the keys may be arranged in a particular format or layout, or a particular font may be used for the indicia. Therefore, the user of an electronic device may become familiar with a certain 'look and feel' with respect to the keypad on that device. An example of a typical keypad generated and displayed on a widely known smart phone is shown in FIG. 14b. The default keypad is generated by the execution of a procedure call within the phone.

In contrast to conventional keypads which have depressible (physically movable) keys, a touch screen can be used to display an image of a keypad having numbered or otherwise indicated 'hot spots' corresponding to the physical keys of the conventional counterpart. The user touches the hotspots corresponding to the keys of his choice instead of pressing a moveable key. Sensors placed below the surface of the screen sense which area(s) have been selected by the user, thus 'reading' the user's input.

Perhaps the most common use of keypads and PIN-based technology is in relation to financial transactions e.g. automated teller machines (known as 'ATMs' or 'cashpoint machines') and point of sale devices for banking cards (i.e. debit cards and credit cards).

Prior to the introduction of PIN-based authentication, if a customer wished to make a purchase for goods or services, he would be required to provide a signature which would be compared to the signature on the back of the card. However, signatures can be forged with relative ease.

In order to address this problem, smartcard technology has been introduced in many countries for credit, debit and ATM cards. This payment system (sometimes known as the 'chip and pin' system) is based on a global standard known as the EMV standard. Using this approach, credit and debit cards are provided with an embedded microchip. When a customer wishes to pay for goods using this system, the card is placed into a "Point of Sale" terminal or a modified swipe-card reader, which accesses the chip on the card. Once the card has been verified as authentic, the customer enters a 4-digit PIN, which is submitted to the chip on the smartcard; if the two match, the chip tells the terminal the PIN was correct, otherwise it informs it the PIN was incorrect. The inputted PIN matches the stored PIN if each symbol in the input is also found in the stored version, and in the same order and number.

In certain situations financial transactions may be carried out by swiping the magnetic stripe on the card so as to read the card's data, or by manual entry of the card details, rather than by inserting the card into a dedicated card-reading device.

It should be noted that as the PIN is sent back to the host for verification, security considerations become relevant because the PIN can be intercepted during the transmission process.

Since the introduction of PIN-based verification, fraud arising from face-to-face transactions (where the card and the customer are physically present at the retail site where the transaction takes place) has been drastically reduced because it is significantly more difficult to fraudulently obtain or guess a PIN than it is to forge a signature.

Moreover, prior to the advent of PIN-based authentication, if a customer's signature was forged, the card provider was usually held legally liable for any ensuing fraud and was compelled to reimburse the customer. With the introduction of smartcard technology, however, the onus has typically shifted to the customer to prove that they had acted "with reasonable care" to protect their PIN, rather than on the card provider being required having to prove that the signature provided during the transaction matched that on the card. This transfer of liability provides very significant financial benefits for card providers.

Another drawback of signature-based verification is that it does not lend itself to transactions where the card (and the customer) is not present at the retail premises when the transaction is performed—for example, transactions made over the telephone or internet. Such transactions are usually known as 'card not present' (CNP) transactions. CNP transactions are now commonplace in today's retail environment, with many customers choosing to conduct financial operations without being at the retail location. However, while PIN-based technology provides a relatively secure authentication solution for 'card present' face-to-face transactions, fraud arising from CNP transactions is rising.

In addition, mobile (cellular) telephone technology has opened new opportunities for retailers and consumers alike. So-called 'smart' phones comprising sophisticated computing capabilities and have become extremely popular, offering the user facilities such as the ability to surf the web and view retailers' web sites. Customers and retailers alike are often not tied to one physical geographical location but are 'on the move'. For example, customers may wish to make a purchase via a web site being viewed on a mobile phone while waiting at a bus stop; or a parking attendant may wish to take payment from a driver in a car park. In such cases, dedicated Point-of-Sales terminals are not available for use.

However, despite the enormous popularity of mobile computing technology, in particular telephones, its use in respect of CNP transactions has been limited due to security concerns as data (such as the user's PIN) can be intercepted during transmission from the device to/from the card provider's server, or whilst residing in the phone's internal memory.

Some PIN related technology has been designed with mobility in mind and is known in the prior art.

For example, CardEase Mobile® is a mobile payment app which, in conjunction with a mobile card reader, enables a retailer to take Chip and PIN mobile card payments from a customer. The retailer enters the amount of the purchase into an app downloaded and installed on his mobile phone (or tablet device). The retailer then gives the card reader device to the customer who swipes or inserts his credit/debit card into the reader, and enters his PIN via the keypad on the reader device. The reader then connects via Bluetooth to the app on the retailer's mobile device, which then connects to the service provider via the phone's internet connection for payment authorisation. Once the payment has been approved, the customer removes his card from the reader and the retailer emails or texts a receipt to the customer.

However, this known arrangement requires the use of the card reader. In effect, it uses the mobile phone to play the role of the point-of-sale terminal which would usually be located within the store/shop. The merchant taking the payment still needs to be at the same location as the customer making the payment because he must hand the card reader to the customer for use with his credit or debit card. The system does not eliminate the need for a dedicated (i.e. purpose built) card-reading device.

Another example of the prior art is disclosed in WO/2012/004395 A1 ('iZettle'). The iZettle arrangement comprises a portable card reader device for reading a smart card, a portable reader device and a payment server. The aim of the disclosed method is to eliminate the unsecure keyboard in a mobile phone used for entering a PIN, and instead use a separate PIN entry device which fulfills the EMV level specification. In essence, the disclosed approach uses an external PIN pad provided with all the required secure chips and components and which simply communicates with the mobile phone via a Bluetooth connection. Thus, as above, the iZettle disclosure does not solve the problem of using unsecure mobile devices for PIN entry, it simply circumvents it by using a separate PIN entry device.

Indeed, the iZettle document states (lines 6 to 19) that:
'A more practical solution would be if a credit card payment could be conducted using a well-known, non-bulky and commonly used device such as a mobile phone. However, an ordinary mobile phone does not have a built-in card reader where you could swipe your credit card, and even if that particular problem could be overcome, there is still and issue regarding the level of security a mobile phone provides. It is well known that for instance a spy program could infiltrate the mobile phone and hijack credit card information and identification information, such as the PIN code entered into the mobile phone via the phone's keyboard when conducting a credit card payment, without the user even knowing it. In light of the above, a standard mobile phone is generally not considered to be a secure device, and thus not suitable for making credit card payments with. Thus, finding a way to make secure credit card payments with a mobile phone is highly sought after'.

Another known arrangement (also from the applicant of WO/2012/004395 A1) comprises a device ('dongle') and associated software which fits into the charging port of a smart phone.

When a transaction is to be made, the customer's card is inserted into the dongle. The customer is then asked to sign the phone's touch screen with their finger in order to authorise the transaction. Using this approach, the user does not need to enter a PIN. Therefore, the problem of PIN entry on an insecure portable device is avoided rather than solved.

Yet another known approach is disclosed in WO 2011/093998 A1. Again, the disclosed approach uses a dongle-based card reader which is plugged into the device. It does not provide a secure technique for enabling PIN-based authorisation.

GB 2416058 A discloses an approach for verifying a request for access to a server. In response to an access request, a random string of characters is generated by a 'combination generator' in a security server. It then uses this random string to generate 'image data' which is sent from the server to the user's computer. The keypad on the user's computer is then modified in accordance with the image data. The user then enters his PIN using the modified keypad displayed on the computer. Positional data relating to the user's selection within the grid of keys (e.g. first-row-first-column) is stored as a record of the user's PIN. The positional data is then converted by the user's machine into character data such as a string of digits to form an encoded PIN which is then sent to the server for verification. However, the encoded PIN can be 'decoded by knowing the image data'—lines 22, 23 of page 10. Therefore, as the image data is stored on the user's computer, if the security of the user's machine is compromised (e.g. hacked into, or is infected with malware) access may be gained to the image data, therefore enabling a third party to decode the user's PIN.

Thus, it is desirable to provide an authentication method which does not render the PIN vulnerable to unauthorised access during transmission between devices, or when stored temporarily in an electronic device during the verification process.

SUMMARY

Ideally, a PIN-based authentication solution which would enable a user to complete a CNP transaction using a PIN to authenticate in a secure manner. Ideally, such a solution:
- could be implemented on a portable electronic device such as a mobile phone, tablet computing device, laptop, PDA etc, or on a desktop computer or fixed device;
- would enable PIN-based authentication to be performed on any suitably arranged device having some computing capabilities;
- would require the user to enter his PIN using the same digits as his stored PIN and in the same order (rather than requiring the user to enter an 'encoded' or somehow disguised/translated version of his PIN);
- would be easy and intuitive to use;
- would not require the user's machine to have access to the user's 'real' PIN, or any knowledge of how to calculate it would not need to execute any conversion or encoding algorithm (which carries with it a time and processing overhead, and can be used to discern the user's PIN).

Such an improved solution has now been devised which provides at least these advantages.

Thus, in accordance with the present invention there is provided a method and system as claimed in its various embodiments herein.

According to a first aspect of the invention, there may be provided a computer-implemented verification method comprising the step of: enabling a user to input an identifier into an electronic device having:
i) a screen; and
ii) a keypad operable within a keypad zone of the screen;
by operating at least one key of the keypad via an image of at least part of a scrambled keypad which is displayed at least partially within the keypad zone.

The image may be referred to as a 'scrambled keypad image' for ease of reference.

The keypad is operable in that has the functionality expected of a keypad by a person skilled in the art. The skilled person would understand the term 'keypad' to mean an electronic or mechanical grid of keys, each having at least one indicia associated with it, which, when selected by a user, causes the associated indicia to be inputted into a device or system for storage and/or processing. In the context of the present invention, the keypad is an electronic version of a keypad. It may be thought of as a 'virtual' keypad in that it is a software emulation of a mechanical keypad. It provides all the functionality of a mechanical keypad, comprising labelled keys which the user can select to provide input to a computer-based system.

The keypad may be generated on or by the electronic device. It may be generated by a procedure call. The procedure may be provided within a library supplied by the manufacturer of the device.

By contrast, the scrambled keypad image is a representation of a keypad. The representation may comprise a representation of a whole keypad or at least part of a keypad. It may depict (represent, illustrate) one or more 'keys'. The image may be electronically formed. It may be a graphical image, an optical image, a video or some other form of visual representation. It may be formed or stored in digital format in an electronic file.

This provides the advantage that the layout of the 'keys' in the representation may not be easily read by an unauthorised party who might intercept the representation during transmission or while it is displayed on the electronic device.

The scrambled keypad image is not a keypad per se because it is devoid of any functionality. It is merely a representation of a grid of keys. Touching, clicking on or otherwise selecting any 'key' depicted in the image does not, in and of itself, produce any effect or generate an input.

However, it should be noted that the scrambled keypad image may sometimes be referred to as a 'keypad' 'scrambled keypad' or an 'overlying keypad' purely for ease of reference because in use it appears to function as a keypad. Areas of the image may be referred to as 'keys', again only for ease of reference because this is what the user appears to see and use. However, it should be remembered that this is not actually the case, and that the image is not a keypad in reality.

The invention may enable the user to enter his identifier via the same device component that is used to display the scrambled keypad image (the screen). Phrased another way, the screen may serve as both the output (display) device for the scrambled keypad image and the input device via which the user's identifier may be entered. This contrasts with any prior art disclosure wherein the keypad is displayed on one device component (e.g. screen) and the user's input is received via another device component (e.g. keyboard).

An advantage of this feature is that it may enable the user's input from the image to be mapped to the electronic keypad which may be at least partially hidden from the user's view such that the user's input is automatically encoded upon entry by the user. The input is automatically encoded in the sense that the electronic device may not need to convert, encode or in any way process the user's input. The keypad may be generated by a procedure call executed on the electronic device. The operable, electronic keypad may be referred to as a 'reference' or 'underlying' keypad for ease of reference.

Preferably, the user's operation of the keypad key via the image generates an encoded version of the user's intended input. Preferably, the image is displayed within the keypad zone such that as the user touches, clicks on or otherwise identifies a location within the image, an operable keypad key at that location is activated to provide an encoded version of the user's input.

Thus, the user's identifier is input via the image. The user may select a portion of the image in order to enter the identifier. The image portion may resemble or depict a keypad key. Thus, the user may operate the keypad through the image.

Preferably, the image functions as a mask or cover superimposed over the keypad such that when the user touches, clicks on or otherwise identifies a location within the image it operates or activates the keypad key positioned at that location within the keypad zone.

Preferably, the keypad zone and/or the image remains in a fixed position on the screen during input of the user's identifier. This differentiates the invention from those known systems wherein the keys or entire keypad move on the screen during the verification process. As the image of the present invention remains in a fixed location, this provides a solution which is easier to use and requires less processing by the electronic device.

Thus, in one sense the invention may be viewed as enabling a scrambled keypad image to be 'superimposed' over an 'underlying' keypad such that when the user enters his input via the overlaid scrambled keypad image it is encoded in accordance with the layout of the underlying (preferably unseen) keypad.

The 'underlying' keypad may be viewed as an object generated and residing in the device's volatile memory at run-time to provide a model of a conventional mechanical keypad.

Thus, the invention provides the advantage that the user's 'real' identifier is never stored within the device and is not transmitted for verification. Therefore, the user's identifier cannot be derived by any potential interceptor without knowledge of the mapping between the overlaid image and underlying, functional keypad.

Preferably, the mapping between the overlaid image and underlying keypad is not stored in the electronic device, or derivable by the electronic device. The mapping (or correlation) between the positions of the two sets of 'keys' may be stored on a server remote from the electronic device.

Preferably, the scrambled keypad image may be sent from a remotely located computer-based resource to the electronic device. The resource may be a server. Thus, the scrambled keypad image may not be generated on the electronic device. A version of the scrambled keypad image may be stored on the server. The version may be a record of the order of the symbols ("keys") in the scrambled keypad image.

The keypad zone may be a defined area or portion of the screen. Thus, the keypad zone may occupy the entire screen area or a portion of the screen. The scrambled keypad image may be displayed such that it covers the keypad zone completely, exactly or partially. Preferably, the underlying keypad is at least partially hidden from view so that the user is not able to see at least some of the keys of the keypad.

The identifier may be a Personal Identification Code. It may be a PIN (Personal Identification Number). It may comprise any number, type or combination of symbols or indicia (as explained above). The identifier may have been pre-selected by the user prior to executing the presently claimed method. The identifier may be stored remotely from the electronic device e.g. on a server. The scrambled keypad image and/or keypad may comprise numeric digits, alphabetical characters, punctuation, symbols or any other indicia, or a combination thereof. One or more symbols may be associated with each key.

Preferably, the user may be able to select a plurality of "keys" in the scrambled keypad image to input an identifier comprising more than one symbol.

The scrambled keypad image may be scrambled with respect to a reference keypad. The keypad image may depict a block or grid comprising a plurality of adjacent keys. It may be 'scrambled' in the sense that the symbols on the "keys" are not in sequential order and/or not in the order which one would expect, perhaps with reference to the reference keypad. The scrambling may be in accordance with a random generation process, or a process that approximates to a random process. The reference keypad may be the keypad operable within the keypad zone, or a default keypad associated as standard with a make, model, type of electronic device.

Thus, the same indicia may be present in both the underlying keypad and the scrambled keypad image but they are provided in different positions. Put yet another way, the order of the keys in the reference keypad is different from that of the scrambled image. The scrambled keypad image may provide the same 'look and feel' as the default keypad associated with the electronic device, but with the "keys" in different relative positions.

The respective positions of one, some or all "key(s)" in the scrambled keypad image may be different from the position of the same key(s) in the underlying keypad.

The user may operate the keys of the underlying keypad via the scrambled keypad image by interacting with the "keys" displayed on the screen. For example, the user's input may be entered by the user touching the screen (with a finger or other device) or by selecting the desired "key(s)" using a pointing device such as a mouse or tracker ball. Other selection methods may be used to similar effect, thus falling within the scope of the invention.

The position and/or dimensions of the keypad zone may be specified by a procedure or method call.

Preferably, the keypad zone comprises a plurality of sub-zones or 'hot spots'. The position of at least one 'key' in the scrambled keypad image and/or keypad may correspond to the position of a sub-zone such that there may be a mapping between the "keys" of the scrambled keypad and the keys of the keypad and/or the plurality of sub-zones. It is desirable that the mapping is not derivable from or by the electronic device. The hotspots may underlie the keys of the scrambled keypad image.

The (underlying) keypad may be scrambled after each of the user's key selections. Thus, a different scrambled underlying keypad may be used for each keystroke of the user's input.

Preferably, the scrambled keypad image is received by the electronic device from a computer-based resource (e.g. a server) located remotely from the electronic device. It may be sent to the electronic device from the server in respect to a request for an image, the request being sent from the device to the server. The scrambled keypad image may be generated by the server.

Preferably, the scrambled keypad image is pre-generated. In one embodiment this may mean that it is generated prior to, not in response to, the request from the electronic device. The image may be generated prior to execution of the verification method.

The encoded version of the user's input (identifier) may be sent from the electronic device to a remote computer-based resource. This resource may be a server. Preferably, the server receives the encoded version of the user's input and processes it. The processing may provide a decoded version of the user's inputted identifier.

Thus, the user's 'real' identifier may not be transmitted. Only the encoded version may be transmitted, which may be meaningless to an unauthorised party who does not know the mapping between the the "keys" in the scrambled keypad image and the keys in the underlying keypad.

The decoding may be performed using a stored version or form of the scrambled keypad image. The stored version or form of the configuration of the keys may be a filename. The decoding step may provide a decoded version of the user's input. Thus, the user's 'real' identifier may be generated by translating each symbol in the encoded version into its corresponding counterpart in the scrambled keypad image.

The user's decoded input may be compared with a stored version of the identifier. The user's input may be deemed to be correct if the input matches the stored identifier.

Preferably, the method further comprises the steps:
generating a plurality of scrambled keypad images;
selecting one scrambled keypad image from the plurality; and
sending a copy of the selected scrambled keypad image to the electronic device.

The method may further comprise the step of:
removing at least one scrambled keypad image from the plurality prior to performing the selection.

The method may further comprise the step of:
removing the selected scrambled keypad image from the plurality after sending the copy to the electronic device.

The method may further comprise the step of:
removing from the plurality any scrambled keypad image which has at least one key in the same position as the same key in a reference keypad.

Preferably, the positions of the keys in the scrambled keypad image remain unchanged relative to one another during input of the user's identifier. This is in contrast to prior art arrangements in which the position and/or order of the keys displayed to the user may scramble or rearrange or move on the screen after each of the user's key selections and/or after each verification session.

Preferably, the symbol of at least one key in the scrambled keypad image is at least partially obscured or obfuscated but remains readable to the user. This may have benefits in making the representation difficult to read using OCR software. This enhances the security of the system and method.

The electronic device may be a mobile telephone, a PC, a tablet computer, a laptop, a PDA, a card-reading terminal or other electronic device having a screen. The electronic device may be able to support a communications protocol such as TCP/IP, either over a wireless or fixed line, although other protocols may be supported, such as Bluetooth, RS232 etc.

The communication between the device (e.g. mobile phone) and the computer-based resource (e.g. server) may be via a fixed telecommunications line or via a mobile telecommunications/wifi etc. connection—essentially any IP-based device may be used.

The scrambled keypad image may be displayed via a web browser, or an application embedded within a browser, or a standalone software application, and/or an application providing a graphical user interface to allow the user to interact with the scrambled keypad image.

It is preferred that the mapping correlation between the indicia positioning of the scrambled keypad image and the underlying keypad is stored remotely from the device, typically at the computer based resource remote from the device.

In order to enhance security, the scrambled keypad image may be renamed and/or encrypted prior to being sent to the electronic device. This provides the benefit that 3rd parties (such as malware) are prevented or at least impeded from intercepting and decoding the identifier.

The method may further comprise the step of delivering an indicator to the user to confirm that the scrambled keypad image has been provided by a legitimate source. The indicator may be a 'watermark'. The indicator may be a textual message, image, video, sound, vibration or other tactile indication. The indicator may have been chosen by the user.

Preferably, the scrambled keypad image is erased from the electronic device following the user's input, or following a specified period of time.

A new (i.e. different) scrambled keypad image may be sent to the device if the user makes a mistake when inputting the identifier.

Also in accordance with the invention there may be provided a computer-implemented method for verifying a pre-stored Personal Identification Code (PIC), the method comprising the steps:
generating a representation of a keypad wherein the position of at least one indicia in the representation is different from the position of the respective indicia in the keypad;
sending the representation to a remote device for presentation to a user to enable the user to input a PIC using the representation;
receiving an encoded version of the inputted PIC from the remote device;
decoding the encoded version to provide a decoded version of the inputted PIC
comparing the decoded version of the inputted PIC with the pre-stored PIC According to a second aspect, there is provided a computer-implemented method for verifying a pre-stored Personal Identification Code (PIC), the method comprising the steps:
receiving a representation of a keypad from a remotely located computer-based resource, wherein the position of at least one indicia in the representation is different from the position of the respective indicia in the keypad;
presenting the representation to a user to enable the user to input a PIC using the representation;
generating an encoded version of the inputted PIC;

sending the encoded version of the inputted PIC to the computer-based resource for decoding such that the decoded version of the inputted PIC can be compared with the pre-stored PIC.

According to a further aspect, there is provided a computer-implemented method for verifying a pre-stored Personal Identification Code (PIC), the method comprising the steps:

using a computer-based resource to generate a representation of a keypad wherein the position of at least one indicia in the representation is different from the position of the respective indicia in the keypad;

sending the representation to a remote device;

presenting the representation to a user via the remote device to enable the user to input a PIC using the representation;

sending an encoded version of the inputted PIC from the remote device to the computer-based resource;

using the computer-based resource to decode the encoded version to provide a decoded version of the inputted PIC and compare it with the pre-stored PIC According to another aspect of the invention there is provided a computer-implemented verification method comprising the step of:

enabling a user to input an identifier by selecting at least one key via a scrambled keypad presented to the user within a keypad zone of a screen associated with an electronic device.

According to another aspect of the invention there is provided a computer-implemented system arranged and configured to perform any embodiment of the method described above.

The benefits of the invention include:

a reduction in the likelihood of fraud arising from CNP transactions;

a significant reduction in the cost associated with such fraud;

a shift in liability from the card issuer to the user in respect of fraudulent card usage;

the convenience for the user of secure CNP transactions.

These and other aspects of the present invention will be apparent from and elucidated with reference to, the illustrative embodiment described herein.

An embodiment of the present invention will now be described, by way of example, and with reference to the accompanying drawings.

BRIEF DESCRIPTION OF THE DRAWINGS

FIG. 11 shows an illustrative 'standard' keypad in accordance with an embodiment the invention.

FIGS. 12a, 12b and 12c show examples of scrambled keypad images which are suitable for being superimposed over the standard keypad of FIG. 11.

FIG. 13 shows a scrambled keypad images being superimposed on top of the standard (reference) keypad of a device.

FIG. 15a shows a pre-generated keypad image prior to the application of a watermark.

FIG. 15b shows the keypad image of FIG. 15a with the watermark provided in the bottom left corner of the keypad zone.

FIG. 15c shows the keypad image of FIG. 15b but with the watermark in a different position (bottom left).

FIG. 15d shows the keypad image of 15a with a photographic image used as a watermark in the background.

FIG. 16a to FIG. 16e show different scrambled keypad images generated from 4 different numeric sequences.

FIG. 17 shows a scrambled keypad image having a combination of alphabetical and numeric keys.

FIG. 18 shows three partial images which, when shown repeatedly in rapid succession, form an apparently static, recognisable image.

FIGS. 20A-20E show an example of the generation of an encrypted PIN based on a user's PIN.

DETAILED DESCRIPTION

Turning to the Figures, an exemplary embodiment is now described in relation to use with a mobile phone. However, the invention may be used to perform PIN verification on a variety of different types of device, assuming that the device has some processing capabilities and a screen for the display of a keypad.

The exemplary embodiment also relates to use in respect of financial transactions. One application for which the invention is suited is that of on-line banking. However, the skilled addressee will readily understand that the invention may be employed in other settings and for non-financial purposes. It is not limited to business or commercial applications.

Importantly, the invention can be used in any situation where verification of an individual's identity is required before allowing that individual to have access to some controlled resource. That controlled resource may be any type of resource. It may be funds sitting in a financial account. Equally, it could be a building, a computer system, a patient's medical records, a service and so on. For example, it may be used for the verification of a passcode on a door lock to establish authentication prior to allowing entry to a building.

It is important to note that the financially-oriented application described below is only one purpose to which this invention may be put. It has been selected for exemplary purposes because chip and PIN verification is perhaps the most widely known use of code-based verification and therefore most readily recognised by readers of this document. However, the skilled addressee will understand that the invention is not limited in respect of the environment or context in which the invention may ultimately be put to use.

It is also important to note that the invention does not constitute a means for performing a transaction per se. It is a verification tool useful for authenticating the identity of an individual who has requested access to a controlled resource. It does not dictate how that access is performed after authorisation is established, neither does it dictate how any other operation or possible transaction is conducted following successful verification.

Figure 6:
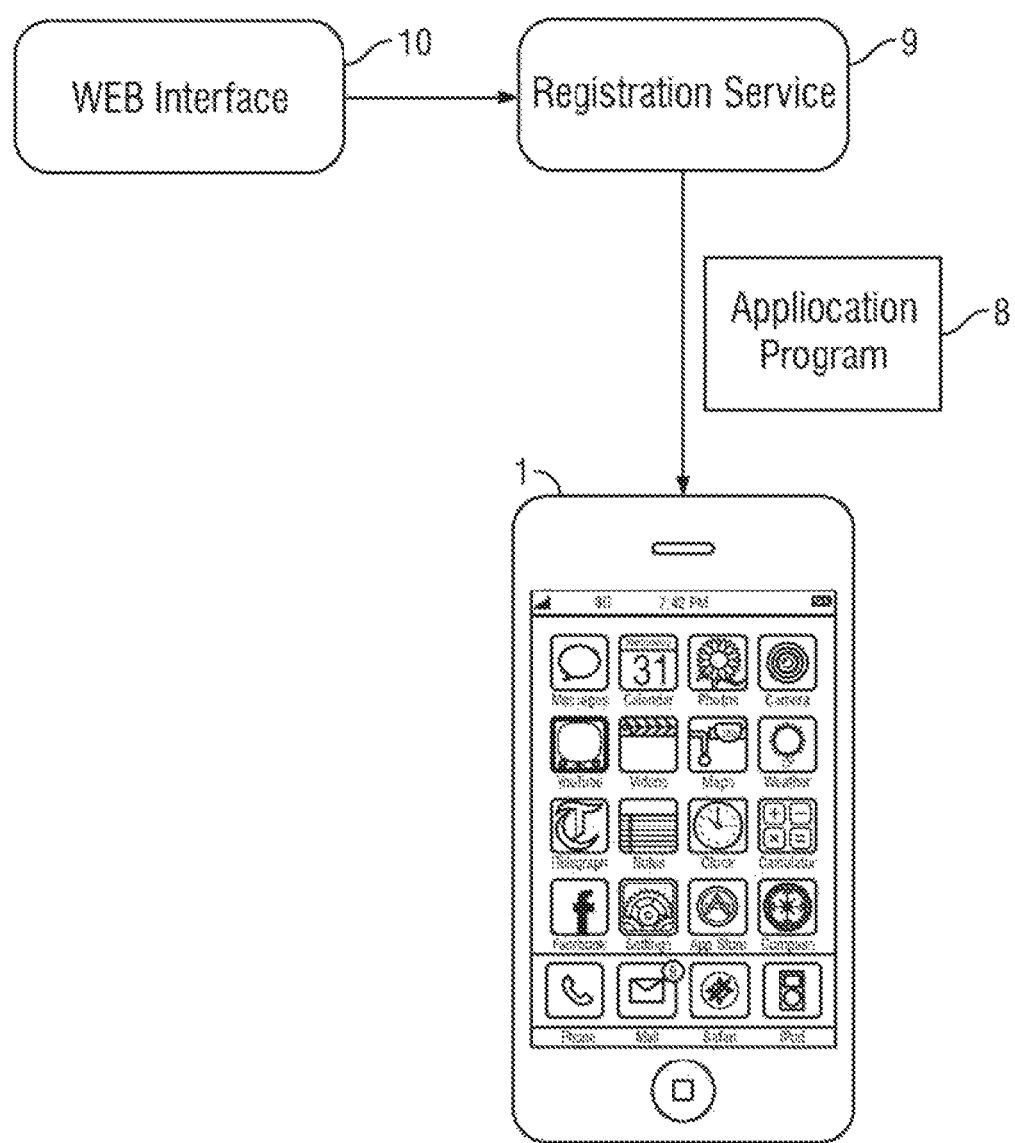
FIG. 6 illustrates the Registration process in accordance with the invention.

The exemplary embodiment described below essentially operates by creating an image of a scrambled version of a keypad (which may alternatively be called a 'PIN pad'). The scrambled keypad image is sent for presentation or display on the target electronic device 1 for the user to view. In this example, the target device is a mobile phone 1, as shown in FIG. 6.

The scrambled keypad image is arranged to resemble the standard, default keypad for the device. Each brand and/or model of device typically has its own style of default keypad which might be different in layout, symbols, size, colour etc. from the default keypads associated with other devices. The default keypad is usually generated and displayed on the mobile phone by a procedure call, which specifies the format of the keypad for that device and where it is to be displayed on the screen. The default keypad is a grid which occupies a specific area on the screen i.e. it is displayed at a specified location. It is a pre-defined area or portion (referred to herein as a 'keypad zone') within the phone's screen. The keypad zone is divided up into sub-zones wherein each sub-zone represents a key in the default key pad. Another way of saying this is to say that each sub-zone is associated with a particular symbol. The symbol for each key is displayed for the user to see on the screen within the location of its respective sub-zone. Therefore, if the user selects (e.g. touches or clicks on) an area designated to a particular sub-zone, the symbol for that associated key is recorded. In this way, the keypad serves as a virtual version of a mechanical keypad, generated electronically by software, detecting the location of the user's input within a defined screen area and using that to generate the input data rather than using physically pressable keys.

In such virtual keypads, each subzone is essentially a 'hotspot' on the screen, and a plurality of hotspots are combined adjacent one another to form a keypad. In the present example, the default keypad 2 of the phone is arranged as a 3×4 grid of keys, each key 4 having a symbol associated with it. In this case, the symbols include numeric digits. Each key 4 is a 'hotspot' area of the screen, each hotspot being associated with a symbol in the virtual keypad.

Figures 11, 12A, 12B, 12C, 13:
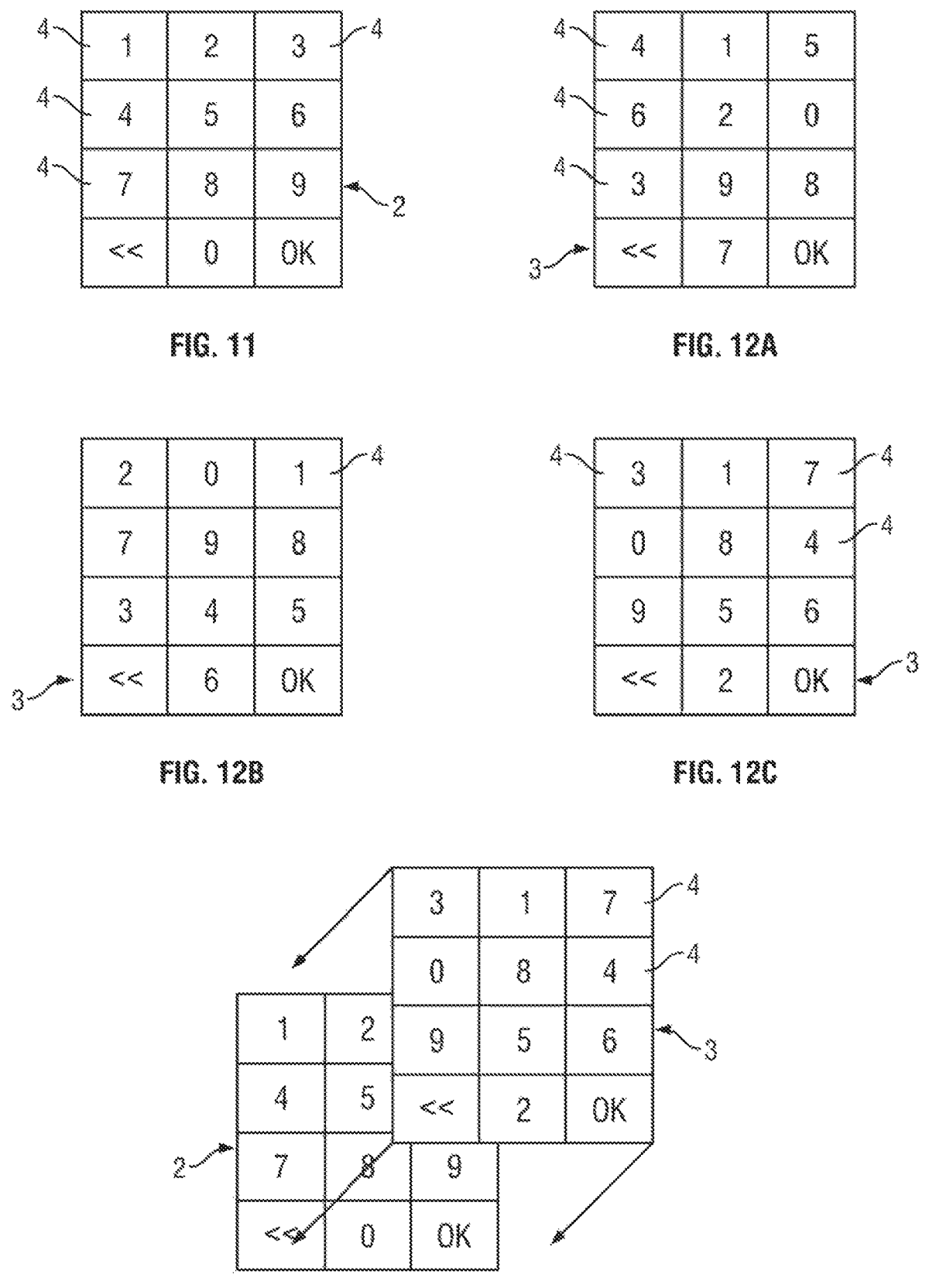

An example of a well-known style of default keypad 2 used with smart phones is shown in FIG. 11. The default keypad 2 is generated on the target device 1 itself—it is not sent to the device 1 from the remotely located server.

This standard keypad 2 is then 'overlaid' with the scrambled keypad image 3 which is sent to the phone and is displayed on the screen at the keypad zone. This superimposition is achieved by displaying the image of the scrambled keypad within the keypad display zone such that the positions of the scrambled 'keys' correspond to the positions of the hotspots in the default keypad. The alignment of the two keypads is such that only the scrambled keypad image is seen by the user and the underlying, operable keypad is hidden, at least partially but preferably entirely, by the image. Therefore, as far as the user is concerned, there is only one keypad, which looks exactly like the keypad the user expects, except with the keys in different positions relative to one another.

As the default keypad for the mobile phone is the 'norm' against which the scrambled keypad is referenced, it may be referred to as a 'reference keypad'.

FIGS. 12a, 12b and 12c show examples of keypad images 3 which are suitable for overlay on top of the standard keypad 2 of FIG. 11.

The scrambled keypad is sent to the phone as an image. Alternatively, it could be sent as a video file, to be discussed in more detail further below. This picture, video or image 3 may be referred to as a 'representation' because in one sense it represents a physical (depressible) keypad.

Figure 3:
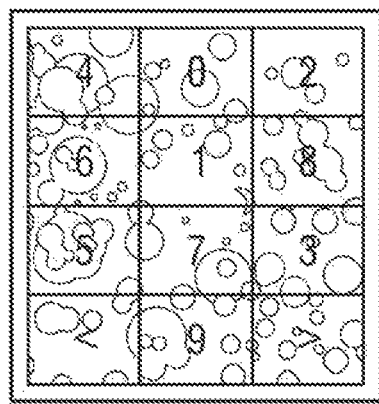

The scrambled keypad image 3 has been pre-generated (i.e. prior to the initialisation of the verification process). It is randomly selected from a set of pre-generated scrambled keypad representations and then sent over a telecommunications network to the handset (i.e. mobile phone) 1. The scrambled keypad image of FIG. 3 is a representation of the default keypad layout 2. The difference between the default keypad 2 and the scrambled keypad image 3 is that the respective keys 4 are ordered differently. In other words, the same digits are present in each keypad but at least two are in different positions within the keypad grid.

This keypad representation 3 has been generated to have exactly the same dimensions as the default keypad so that it can perfectly superimpose it. Thus, the mobile phone user (customer) views only one seamless keypad. The user is unaware that there is an underlying keypad 2 which has been generated in the background, behind the one that he sees and uses for entering his input. The image is sent to the user's device together with one or more instructions to invoke or call the necessary procedure for generating the underlying keypad.

The randomly-selected, scrambled keypad image 3 is effectively overlaid onto the phone's default keypad 2 so that when the user enters his PIN, a different result is generated within the device other than that which the user intended to enter, or at least thought he was entering. This is achieved as a result of the relationship (mapping) between the differently positioned keys 4 in the two keypads 2, 3. The user touches the screen at a particular location to enter a digit shown in the overlying scrambled keypad image 3, but this is interpreted as being the digit in the underlying keypad 2 at that sub-zone. As the user enters a subsequent input its corresponding, underlying symbol is concatenated to the previous input to construct a complete PIN.

In this way, an encoded version of the user's PIN is produced based upon the position of the hidden keys 4 which the user selects via the scrambled keypad representation 3. If the user makes a mistake, a new (different) keypad representation 3 is sent to the device 1.

Thus, the PIN that the user thinks he is entering is not the PIN recorded by the software residing on the user's phone. The user's 'real' PIN is never stored on the insecure phone 1, and is not transmitted over any (insecure) network. Only the encoded version is stored, transmitted. The encoded version of the PIN may be encrypted prior to transmission to further enhance security. Thus, any interceptor would be unable to decode, guess or re-translate the real PIN without knowing how the positions of the keys in each keypad map to one another.

In the present embodiment, the decoding process is handled by a component of the invention which 'knows' the layout of the keys in both keypads and is, therefore, able to map the encoded digits back to their original counterparts, thus arriving back at the user's intended input. This deciphered PIN can then be compared against the user's previously stored PIN for verification purposes.

In the exemplary embodiment, the scrambled keypad image 3 is encrypted before it is sent to the phone 1. Upon arrival at the phone 1 it is loaded into a secure or protected portion of memory on the device 1 (or at least as protected as it can be). In other words, all of the usual security features are used by the invention as if the customer's real PIN has been entered (rather than a translated version). This provides another layer of security and protection.

These aspects of the invention are now discussed in greater detail in relation to one way in which the invention can be put into use.

Pin Pad Production

Figure 5:
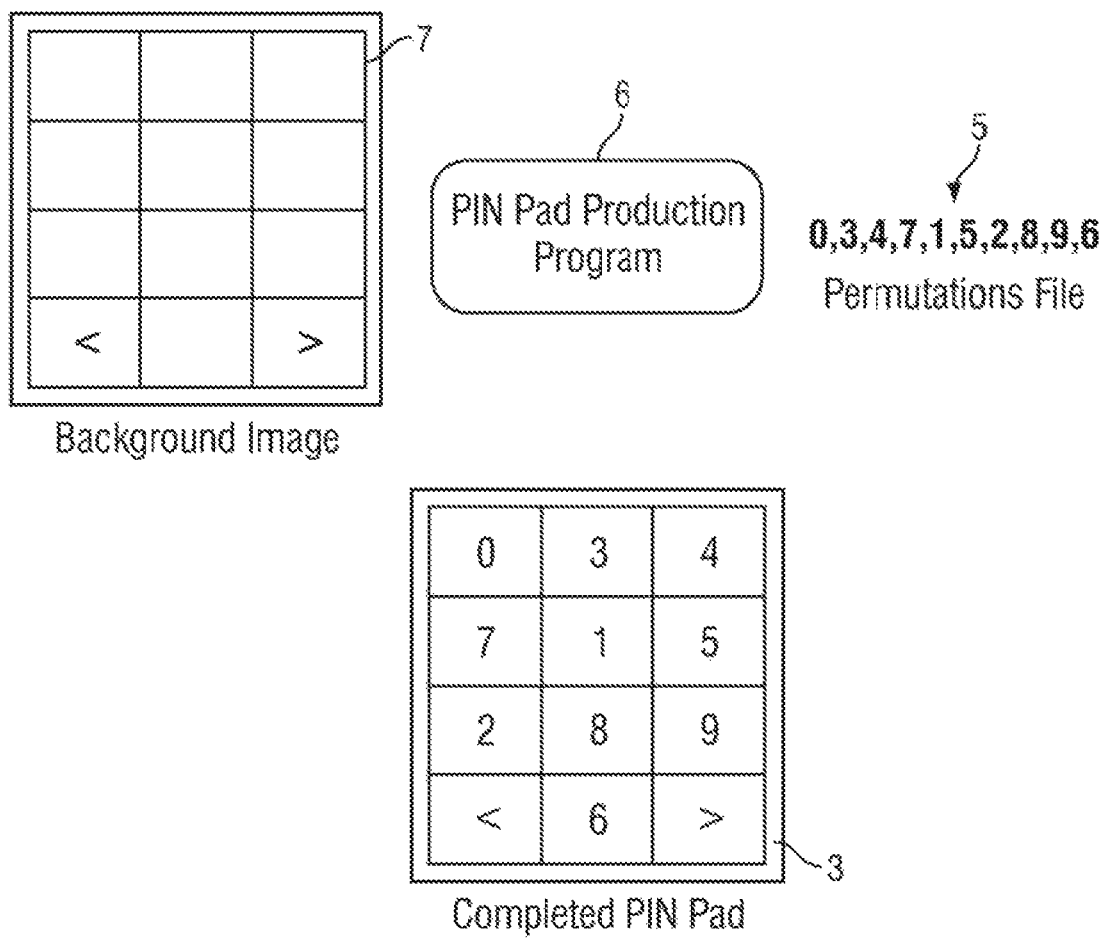
FIG. 5 illustrates the production of a scrambled keypad representation according to an exemplary embodiment of the invention.

The 'PIN Pad Production Program' 6 is responsible for generating all of the scrambled keypad images 3 used throughout the system. An overview of this aspect of the invention is shown in FIG. 5.

If simply randomly scrambled keypads are used, there is a risk that one or more keys may not be positionally scrambled. This could resort in one or more keys of the users input PIN corresponding positionally on the standard and scrambled PIN. This is not ideal.

Consequently, during PIN pad (image) generation, scrambled key pad images that would have one or more keys positionally corresponding to the standard keypad are discarded. The PIN pad production is therefore preferably not purely random, but is subjected to a selection process to select/discard according to a specific criteria.

The PIN pad (image) generation takes place in a secure environment, typically complaint with payment card industry data security standard.

The output resolution and file type must be initially set up before use on a particular target device 1 (in this case the type of mobile phone). This ensures that outputted images are generated to the optimum resolution for that device e.g. 256×184.

A master 'Background Image' 7 is then selected which matches the resolution as set above, and a 'Permutations File' 5 selected containing all the required permutations of digits (keys) for the final keypad images. In one implementation, this file 5 must be a comma separated text file with each permutation on a new line. However, a variety of implementations may be devised to the same effect. For example, each permutation could be separated by a # or *.

The 'Permutations File' 5 is then merged with the 'Background Image' 7 using the user's selection of Font Type, Size and Colour to produce the completed keypad image 3. The completed keypad image 3 is then optimized and reduced in size to be as small as possible for optimum transmission speed.

In addition to standard monochrome keypads as shown in FIGS. 1, 5, 9 11, 12 and 13, the background image 7 may be manipulated. For example, the colour of the background and/or the default font type, size and colour can be altered so that an unlimited database of keypads may be generated for every type of screen and device.

In some embodiments, advertisements, educational messages or other content may be incorporated in the presented imagery.

These keypad images may employ special fonts or colours to enable any specific regional characters e.g. Arabic to be used, and also to ensure that the images cannot be read by unauthorised Optical Character Recognition programs (thus enhancing security).

Each keypad image that is produced is also given a unique filename and a master index is created for all keypad images that have been generated. When a scrambled keypad image is sent to the device, a copy of the filename of that image is temporarily stored. This filename contains the order of the keys within the keypad image. This enables the mapping between the scrambled keypad image and the reference keypad to be recorded.

For security purposes, the scrambled keypad image 3 is renamed before it is encrypted and sent to the remote device 1; this prevents malware or other unauthorised parties from possibly intercepting and decoding the PIN.

FIGS. 1 to 4 illustrate some examples of the various appearances that the scrambled keypad images 3 can be provided with in accordance with the invention.

Figure 1:
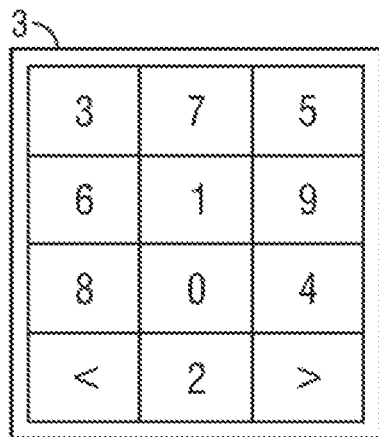
FIGS. 1 to 4 illustrate some examples of the various types of keypads that can be generated in accordance with the invention.
Figure 2:
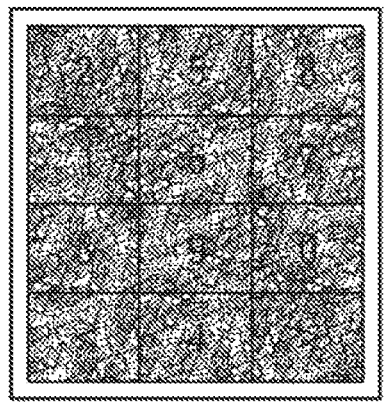

By way of example, FIG. 2 shows a scrambled keypad image 3 having a background of autumn leaves. This can be used by the retailer for seasonal variations or can be used for advertising purposes.

FIG. 3 shows a black and white only image distorted so that it cannot be read by OCR software. The skilled addressee will be aware that such images require high resolution screens to display correctly.

Figure 4:
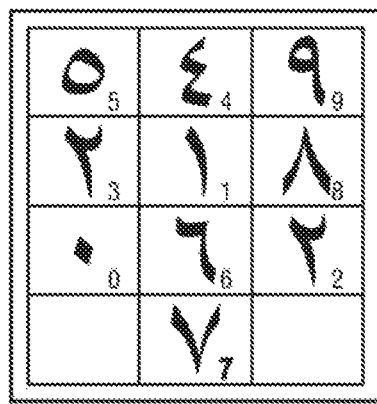

FIG. 4 shows a monochrome keypad image that has been modified for the Arabic alphabet. The skilled addressee will appreciate that this regional difference in the characters can also be combined with the other imagery techniques methods illustrated in FIGS. 2 and 3.

On suitably powerful devices, a video overlay may be used instead of a static image to further decrease the potential that OCR software could be used to read the keypad. This feature could also be used for advertising purposes.

It is important that, in order to provide a necessary level of security, malware and unauthorised parties are not able to read the data contained in the scrambled keypad image displayed to the user. As described above, this is achieved by the invention by providing the scrambled keypad in a single image or picture format. While it is possible to OCR images on a microcomputer, mobile telephones do not have the capabilities to do this, and it would be almost impossible for hidden malware to possess the required level of sophistication without attracting detection.

This issue can, at least in part, be addressed by using random backgrounds and fonts which cannot be understood by OCR technologies. The problem could also be addressed by delivering the keypad image as a video file. While video files do not lend themselves to being read by OCR technologies it is technically possible for a third party to 'grab' a single screen from a video file and read it.

One solution which may be incorporated into various embodiments of the invention would be to combine the two afore-mentioned systems into one. Thus, the scrambled keypad image is presented to the user in a plain format (ie non special fonts are used and the background is 'normal') but the file itself is a small video file which, when played, tricks the eye into thinking that the image is solid and static. In reality no single frame contains enough information for it to be reverse engineered back into understandable, useable content.

Figures 17, 18:
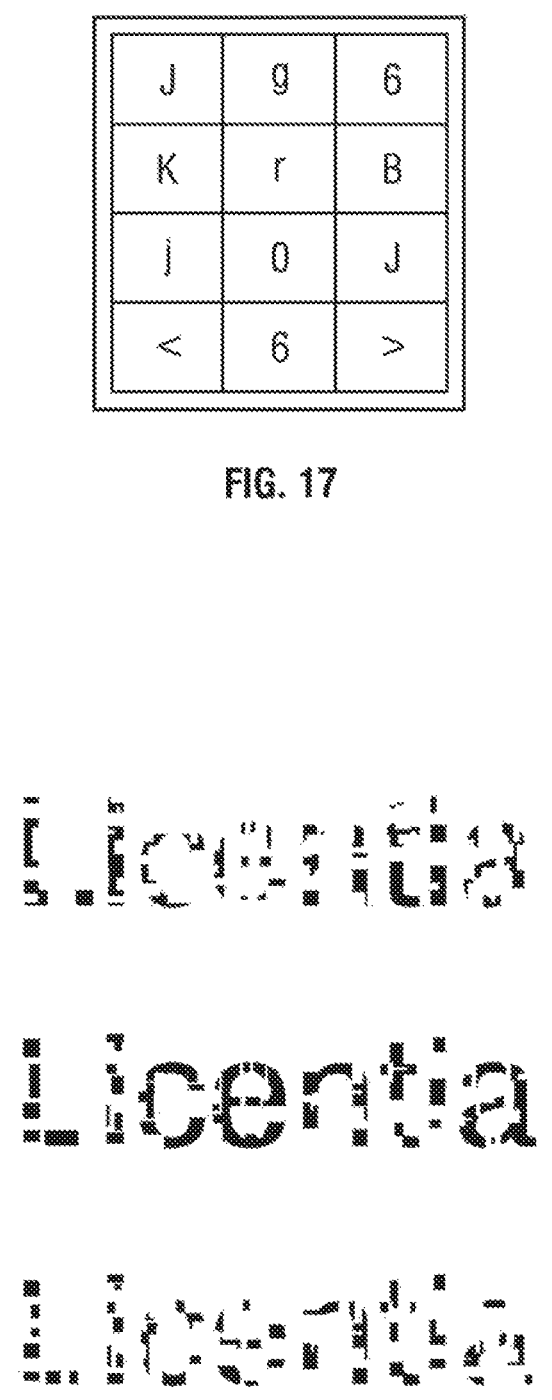

The system can be achieved in as little as 3 frames, each played quickly and in succession so as to appear static. An example is given in FIG. 18. When combined into a video file the static word 'Licentia' is displayed but the individual images are unreadable by an OCR package.

Registration Process

This aspect of the invention is illustrated in FIG. 6.

In certain embodiments, a device 1 must be registered before it can be used with the system of the present invention and a small application 8 downloaded to the target device 1. If the device being used is a mobile phone 1 then the update process can occur 'Over The Air' automatically; if the device is a fixed terminal then the software 8 may be downloaded over a fixed line, although it may alternatively be built into the device at the time of manufacture and simply updated if required.

To register a mobile phone 1 with the system the user would need to undertake a registration process comprising the following steps:

1. Logo onto registration service 9 via a web-based interface (e.g. web site) 10
2. Enter their personal details i.e. Name, Address, Postcode (ZIP), Phone Make Model, Email address, Mobile Phone Number The nature and type of data required may be stipulated by the system operator and vary from country to country depending on the application with which the system is being used. Furthermore, registration data may already be held by the operator as the customer may be an existing client and therefore only the application may need to be pushed to the device.
3. A link is then sent to the mobile handset 1 for the user to follow or the application 8 is simply 'pushed' down to the handset.

When run for the first time, the application 8 sets up the device 1 and downloads any additional data which may be required, such as encryption keys etc. A custom keypad image database is also created on the server for the registered device (as shown in FIG. 7).

To register onto the system with a fixed device the user would complete a similar process as follows:

1. Logo onto registration service 9 via a web-based interface 10
2. Enter their personal details i.e. Name, Address, Postcode (ZIP), Phone Make Model, Email address As above for the mobile phone, the required data would be dictated by the system operator.
3. The device then connects to the server either via a fixed line or wireless and if required updates the internal application. Any additional data that is required, such as encryption keys etc., is downloaded. A custom keypad image database is also created on the server for the registered device (see FIG. 7)

Figure 7:
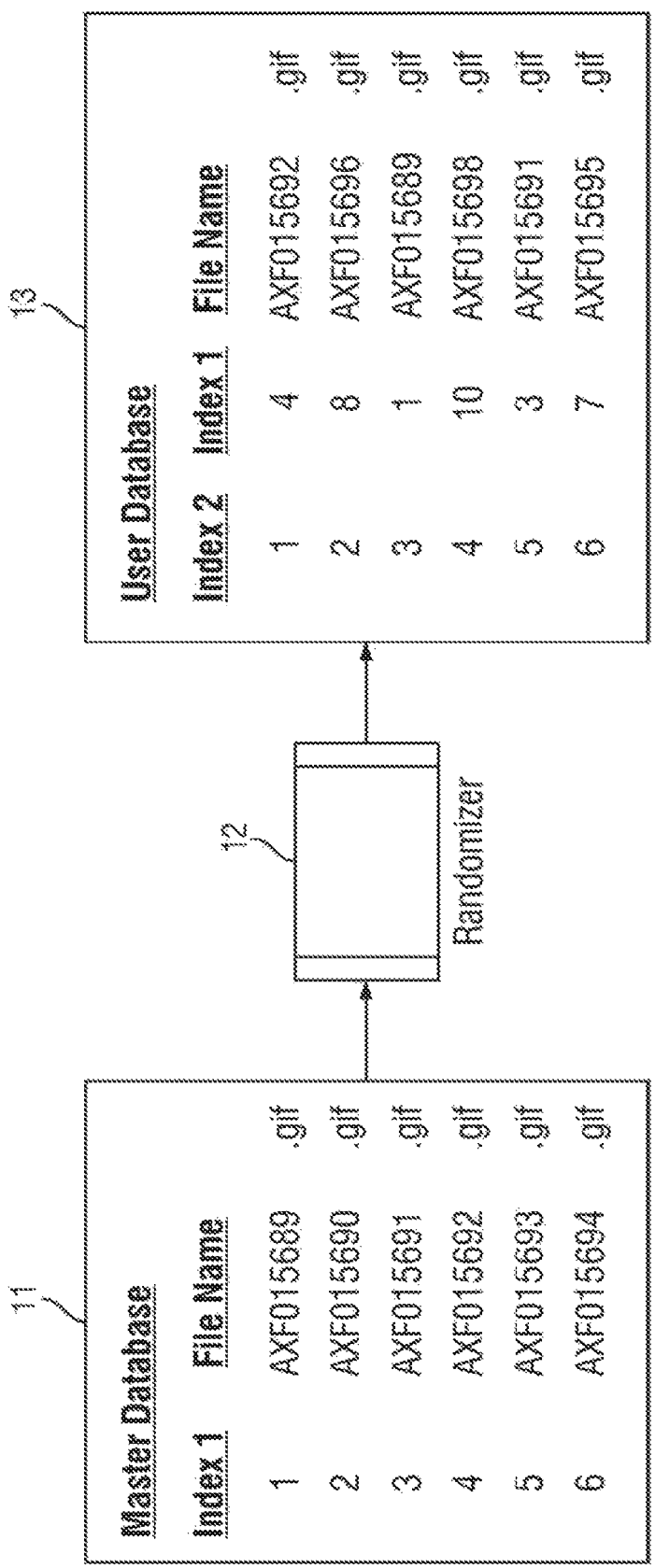
FIG. 7 illustrates an exemplary custom keypad database created for the registered device.

Consider FIG. 7. For both scenarios outlined above, for each device that is registered onto the system a custom database (or index) 13 of keypad images is created from the Master Database 11. The Master Database consists of keypad images that have been generated specifically for the user's registered model of device to ensure optimal display. This database (or Index) 11 is then randomized 12 to ensure that no two devices have the same order of scrambled keypad images i.e. keypad ref 'AXF015689.gif' may be in location 65894 for one device but in position 125948 on another. Again, this enhances security.

It should be noted that in certain embodiments user registration may not be a requirement. This may be the case where the software is integrated into a 3$^{rd}$ party application. In such embodiments, the required registration method may have been put in place by the third party.

Transaction Process

Figure 8:
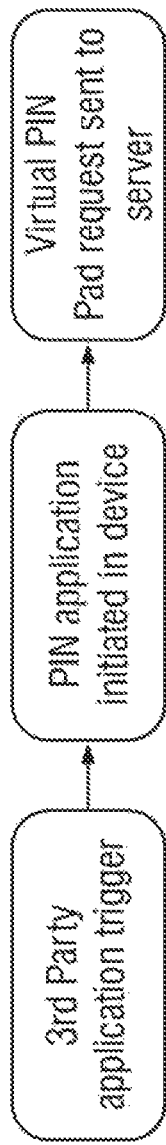
FIG. 8 shows an illustrative transaction process in accordance with the invention.

This aspect of the invention is illustrated in FIG. 8.

Upon successful registration of the user and device, transactions can be performed. An authentication (PIN request) can be initiated by several methods depending on the manner in which the system has been integrated with 3$^{rd}$ party applications.

Typically integration occurs with 3$^{rd}$ parties who:

a. Manufacture card swipe or chip reading devices that are attached to the mobile device, or
b. Push financial information and subsequent payment request down to the handset i.e. toll road applications; or
c. Provide websites which require secure PIN entry to gain access to information when used in applications such as online banking access.

However, the invention is not intended to be limited in this regard and the nature of service or resources provided by the 3$^{rd}$ party is not a limiting feature of the invention.

In all cases described above there is a common trigger for the PIN application to load and perform the subsequent PIN entry process.

Once a request for an image has been received by the server (which may be referred to as the 'computer-based resource') the incoming device 1 is identified and authenticated and, if successful, the next keypad image from the device's 'Index' 13 is encrypted and transmitted to the device 1. The keypad images are sent sequentially as per the devices 'index 2' as shown in item 13 of FIG. 7 (in order from top to bottom) and are not reused.

Once the encrypted keypad image 3 is received by the device 1 it is decrypted and passed to the 'Secure Terminal Application'.

Figure 9:
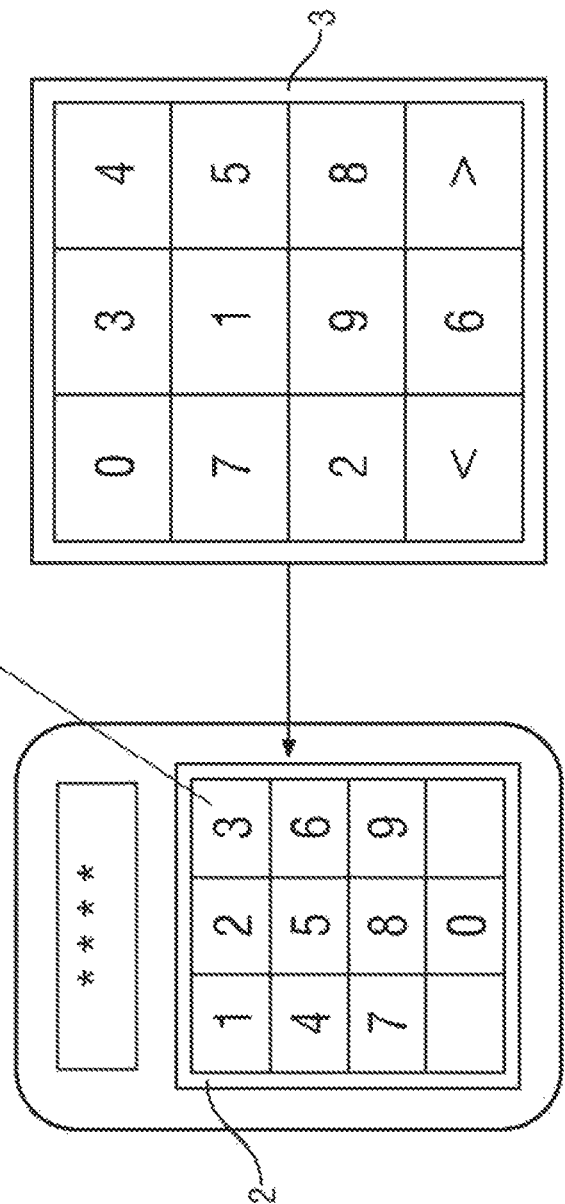
FIGS. 9 and 10, illustrate an overview of an example secure transaction application process in accordance with an embodiment of the invention.
Figure 10:
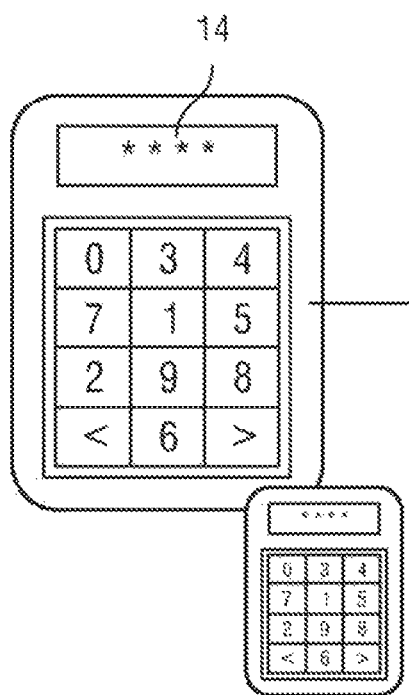
Figure 14A:
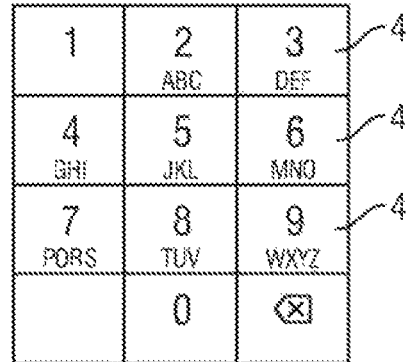
FIG. 14a shows a standard numeric key pad as known in the prior art.
Figure 14B:
FIG. 14b shows a numeric keypad on a mobile phone as known in the prior art.

Secure Terminal Application This aspect of the invention is illustrated in FIG. 9 and FIG. 10.

The 'Secure Terminal Application' is the program that resides on the target device/phone 1 or the fixed terminal and is responsible for the secure input and transmission of the user's inputted PIN back to the server.

As described above, a keypad 2 is created on the device in a 3×4 grid. Each hotspot is assigned a numerical character. The application then 'overlays' this reference keypad 2 with the randomised keypad representation 3 that has been pre-generated and sent down to the handset 1. This scrambled keypad representation 3 has been generated to exactly the same dimensions as the keypad 2 underneath and perfectly overlays it, as described above.

Thus, when the user enters their PIN number 14 using the scrambled representation 3, a different, encoded output is generated. In the example below, if the user's PIN was '6725' then the output from the keypad would be '0476'. It is the keypad output of '0476' that is encrypted and sent back to the server's 'Decryption Engine'.

Once the keypad has been pressed four times the scrambled keypad image 3 is securely wiped using a secure deletion algorithm from the protected memory where it resides.

The Decryption Engine

Once the central server ('computer-based resource') receives the incoming encoded and encrypted PIN from the handset 1 it must be converted back into the original user PIN.

This is done by the 'Decryption Engine' which is held on a separate secure server solely for this purpose. As described earlier, when the device 1 identifies itself to the server and requests a keypad image 3 the unique filename for the keypad image that was sent to the device 1 is temporarily stored. This filename contains the order of the keys within the keypad i.e. for the keypad image shown in FIG. 9 the filename would be '0347152986'. This enables the mapping between the scrambled keypad image and the reference keypad to be recorded. For security purposes, the scrambled keypad image 3 is renamed before it is encrypted and sent to the remote device 1.

When the encrypted PIN arrives the message is firstly decrypted using the shared key used for the handset/device (this may be Triple DES or Public Private Key, or whatever is deemed appropriate during development according to the handset).

Once the message has been decrypted the encoded PIN that was generated by the user input must be decrypted. To do this the filename of the keypad image that was sent is copied into a temporary array and then for each number that was generated by the user input the number in the corresponding array position is substituted, thus revealing the actual PIN number.

So for the example above where the user's PIN was 6725, the handset generated and transmitted an encrypted PIN of 0476.

Now when the filename of the keypad image that was sent is copied into the array '0347152986' we get the data shown in FIG. 20A.

For each number in the generated PIN the 'Array Position' is located and the corresponding 'Filename Character' is substituted.

First Digit of PIN=0 (GOTO array position 0); First digit of user's PIN number=6 as shown in FIG. 20B.

Second Digit of PIN=4 (GOTO array position 4) Second digit of user's PIN number=7 as shown in FIG. 20C.

Third Digit of PIN=7 (GOTO array position 7) Third digit of user's PIN number=2 as shown in FIG. 20D.

Fourth Digit of PIN=6 (GOTO array position 6) Fourth digit of user's PIN number=5 as shown in FIG. 20E.

After the decryption process has been completed the user's 'real' input of 6725 is revealed. This PIN number 6725 is then encrypted using standard banking encryption and passed to the Acquirer or banking partner for processing. It should be noted that this is only further encrypted and passed to the acquirer in embodiments relating to a financial transaction. The data may or may not be further encrypted depending upon the nature and requires of the specific application.

The array is then securely erased to ensure security, along with any other temporary data.

It should be noted that in certain alternative embodiments, 12 smaller key pictures (one for each number or hotspot) may be provided. The phone or other device may be arranged to to select a random number and rearrange the individual pictures into a 3×4 array (and thus making up a virtual keypad on demand). However, such embodiments present potential security loopholes and may provide several access points for malware to obtain the user's PIN (as the handset/device would have to transmit the random number and thus the order of the PIN pad back to the server). Therefore, such an embodiment is suitable for applications where required security levels are somewhat relaxed.

It should also be noted that although the invention has been described above in respect of a mobile phone having a touch screen, other embodiments may comprise a different type of device. For example, in another embodiment the device could be a personal computer, or a laptop, or a tablet computer. The embodiment would function essentially as described above except that as general purpose computing devices, such as PCs, do not typically comprise a standard procedure call for generating a keypad as mobile phones do, the keypad zone and hotspots are specified by a purpose-built software component executing on the device. The software specifies the portion of the screen which makes up the keypad zone, and the locations of the sub-zones (keys) and their associated symbols within the keypad zone. The scrambled keypad image is displayed at that location to provide the superimposition technique described above. The underlying keypad is generated using the same (or substantially the same) procedure call used by the smart phone implementation.

In another embodiment, a terminal could be provided which resembles the known card-reading terminals used in retail environments. The terminal may comprise a touch screen and comprise internal components replicating those of a mobile telephone. Thus, the terminal can receive and send data as a phone can, and the terminal can function is accordance with the invention as described above in with reference to the target device being a mobile phone.

Thus, the invention can be configured for use with a variety of computing-related devices to equal effect.

In addition, the invention can be configured to include various features which further enhance the security of the user's data.

Watermarking

For example, so-called 'man in the middle attacks' are a known problem. This can be addressed in the present invention using a 'watermark' feature to demonstrate to the user (i.e. a retailer or possibly the end customer) that the input device is communicating with a legitimate party (e.g. the appropriate bank) and therefore that the scrambled keypad image has been sent by that legitimate party and not an imposter.

Such a feature may be implemented in a variety of ways. For example, when a retailer registers to use the system they choose and store a secret indicator (word, phrase, number, name, image etc.) that only they and the trusted party knows. Then, when a transaction is required the following process is performed:

1. the consumer's card is read
2. The transaction amount is entered
3. the pin entry screen is displayed on the terminal When the PIN entry screen is displayed the merchant must physically check that the pre-selected secret word etc that they registered is displayed on the screen before handing the terminal to the customer for their PIN entry. This is essentially the same principle which is employed in ssl technology wherein one looks for the small yellow lock icon as confirmation of the site's legitimacy.

By doing this, the responsibility is placed onto the merchant to ensure that the device is talking securely to a legitimate party. If a different indicator (watermark) is displayed from that which the merchant expects, or no indicator is shown at all, it can be assumed that the process has been compromised.

Figures 15A, 15B, 15C, 15D:
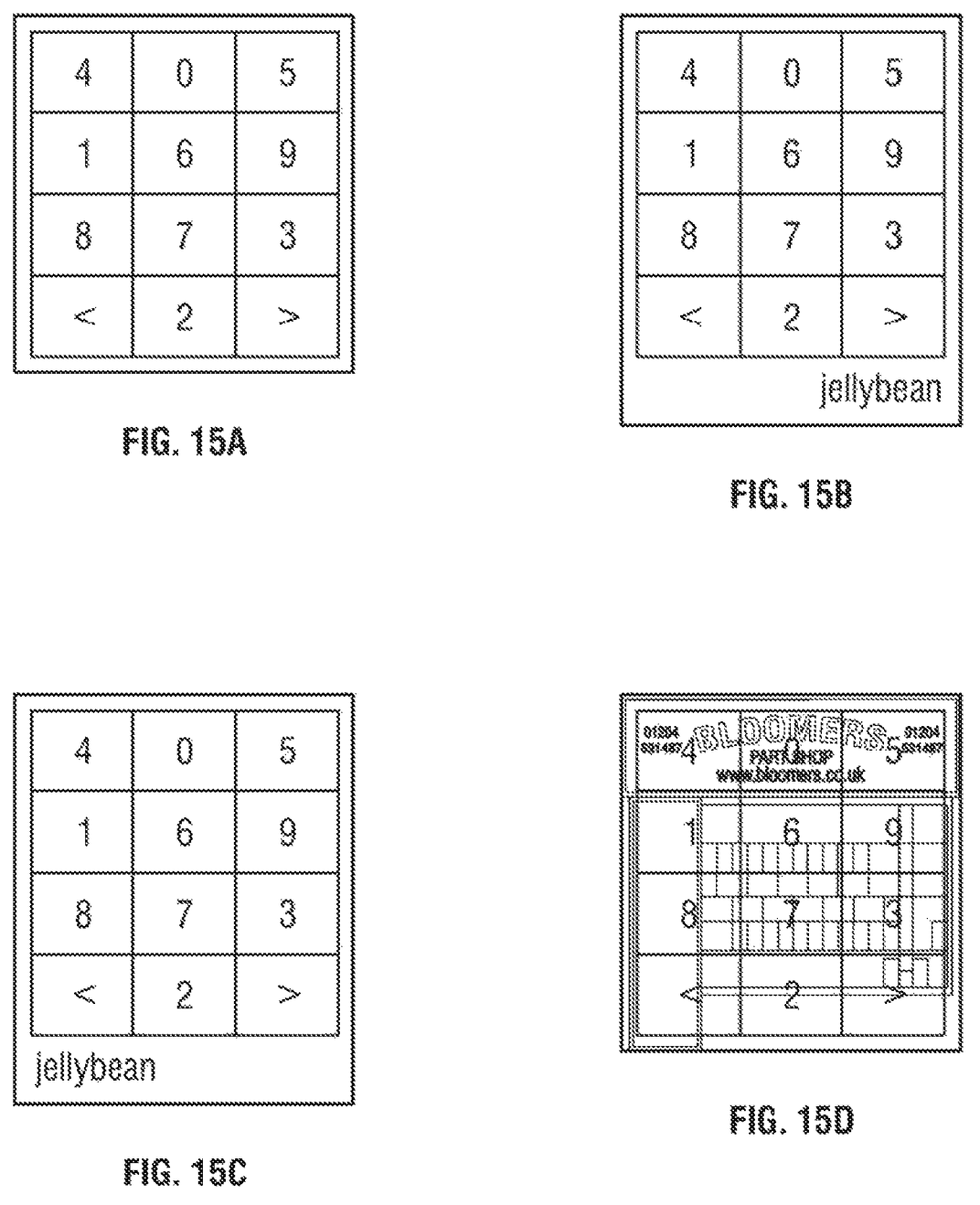

This watermark may stay on the screen for duration of the PIN entry by the consumer. However, it is preferable that it is only displayed for a short period of time (e.g. the region of a few seconds) and then disappears before it may be seen by any other person, such as the customer. If the watermark is seen by another person, this could allow them to perform a man in the middle attack. FIG. 15a shows a pre-generated pin pad picture that is blank. The system creates a new pin pad picture to include the user's secret word 'jellybean' which is then encrypted and sent to the device. This is shown in FIG. 15b.

Upon registration the user may also choose where to have the watermark displayed e.g. right, left, centre, top etc. A keypad image having the watermark in the bottom left corner is shown in FIG. 15c. In alternative versions, a text colour or font style, or size may also be chosen.

Moreover, the watermark does not have to be in textual form. In some embodiments, the user may upload a photograph or other file (for example, a family photo or a photo of the shop etc.) so that this picture is displayed in the background. This is illustrated in FIG. 15d.

This watermarking feature is suitable for employment with all embodiments of the invention, irrespective of the context in which the invention is used or the nature of the device used to display the keypad (e.g. online through a browser, via a terminal arranged for use with the invention, or a mobile phone etc.)

Additional PinPad Encryption

In order to further enhance the security of the system, the invention may employ one or more techniques for making it more difficult for an unauthorised party to figure out, discern or calculate the mapping between the displayed keypad image (i.e. the one that the user uses to enter his PIN) and the underlying keypad.

For example, if the user has selected a PIN which contains the same digit more than once (e.g. 1223) this may make it easier to compute the correlation between the input and the 'underlying' keypad.

One possible approach to overcoming this could be to create more than one underlying keypad. For example, a virtual keypad could be generated for each key press. An example is given below.

FIG. 16a shows a scrambled keypad image, and FIG. 16b shows an 'underlying' keypad. If the user's PIN is 1111 then the encoded PIN sent back to the server would be 9999. This provides a potential hacker with a starting point for an attempt at calculating or guessing the user's PIN.

However, if 4 different 'underlying' keypads are used instead of one, this problem is overcome. Thus, a sequence of digits can be sent to the target device (e.g. terminal, phone, PC) and the sequence is used by the target device to form the keypad. For the keypad in FIG. 16b, the sequence would be 3156790482. Using this approach, it is possible to generate a new keypad for each required key press.

Thus, the top pin pad as per FIG. 16a is sent to the target device as an image, in accordance with the description set out above. Then, 4 numeric sequences are sent for the creation of the underlying keypad e.g. 3156790482, 0746189352, 0347156289, 2581673904. This produces the keypads shown in FIGS. 16b to 16e.

Suppose now that the user's input is 1111. Instead of 9999 being produced, the code 9857 is produced and sent back to the server for decryption. As the server 'knows' which scrambled keypad image was sent, and which sequences of digits, the resulting encoded PIN appears to be much more random and is therefore much harder to decipher by an interceptor. The decryption process at the server end remains as set out above.

Moreover, in order to enhance security further it is possible to use combinations of other characters in the generation of the keypads, not just characters. For example, the sequence Jg6KrBjoJ6 could be sent. This would generate the underlying keypad shown in FIG. 17.

In such an embodiment, the use of randomly generated strings of characters in the bottom keypad reduces the need to 'filter' the underlying keypads (as described above) to remove potentially unsuitable keypads which might provide an attacker with a possible starting point for an attack.

However in a preferred embodiment only 1.6 m scrambled ('top') keypad images are used rather than the possible 3.6 m and a check is still performed to ensure that no mapping is the same ie. 1=1 between the superimposed and the underlying keypads.

System Level Architecture

Figure 19:
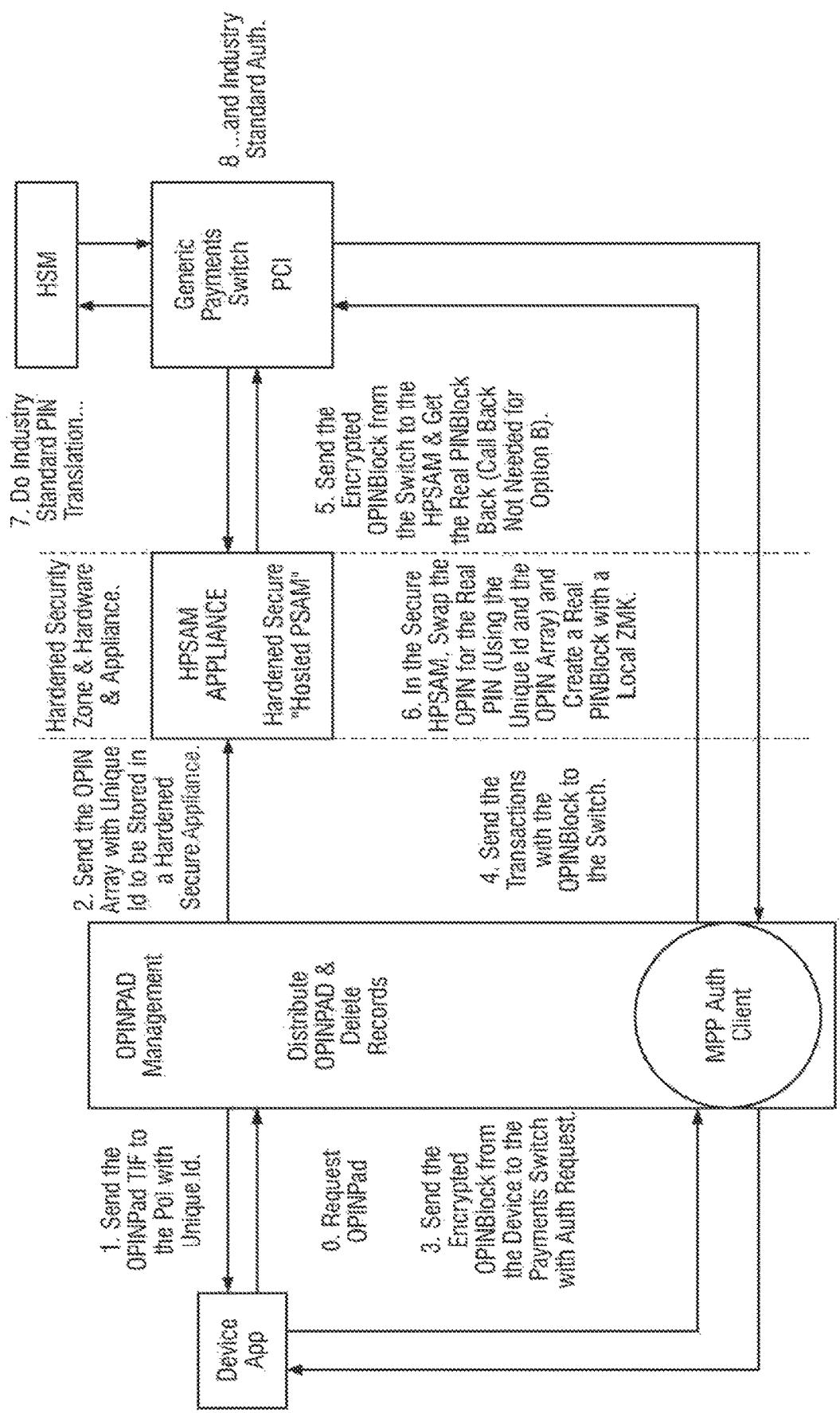
FIG. 19 shows an example of how the invention may be implemented within a financial transaction processing system.

FIG. 19 illustrates one manner in which the invention may be implemented into a transaction system.

FIG. 19 includes the following system components, or modules.

Device app: an app that runs on a terminal or mobile phone to manage user interaction and technical process flow including initiating a payment transaction, interacting with card reader, requesting an oPinPad (i.e. scrambled keypad image), encrypting the entered oPin and sending the transaction online for authorization.

OPinPad Management Module: a stand-alone application module that runs in a central secure data center on a dedicated server. It holds a database of all oPinPad TIF images and manages distribution of the oPinPad TIFs on demand.

Auth Client: a stand-alone application module that runs in a central secure data center, possibly on the same server as the oPinPad Management Module (or, in some embodiments on its own dedicated server). It receives the message from the Device and prepares it to be sent to the Payments Switch for Authorisation.

HPSAM Appliance: a stand-alone application module that runs in central secure data centre on a dedicated server. In some embodiments the server may be security hardened.

In FIG. 19, the following terminology is used:

Device: Payment Terminal or Mobile Phone where payment transaction is taking place oPin: "Obfuscated PIN"—the encoded PIN which is generated by the keys of the underlying Device keypad; this is not the actual cardholder's PIN Real Pin: The real PIN associated with the consumer's card that would be 'swapped' for the oPin before being verified by the card issuer oPinPad: Obfuscated Pin Pad (i.e. the scrambled keypad image)—the TIF image which is presented to the card holder to enter their PIN and having 'keys' in scrambled positions relative to the underlying Device keypad oPinPad Array: Array to be used for mapping the oPin with the Real Pin, as described above HPSAM: Hosted Payment Security Access Module HSM: Hardware Security Module Card Reader: The terminal/mobile device which contains or is connected to a Card Reader which retrieves payment card details from the consumer Tag: Unique identification number assigned to the oPinPad to assist with later processing ZMK: Zone Master Key.

Referring to the numeric references in FIG. 19, the process flow of the illustrative system is as follows:

0. The device initiates a payment transaction and captures the Amount (from the user interface) and Card Details (from the Card Reader). Sensitive data from the Card Reader is encrypted before getting to the App. The App goes online and requests an oPinPad from the server. If possible the oPinPad would be requested at the same time as the card details are retrieved from the Card Reader.
1. The oPinPad Management Module retrieves an oPinPad (i.e. scrambled keypad image) from a database and assigns it with a Tag. The oPinPad TIF and the Tag (unique id) are sent back to the device.
2. The oPinPad Array is sent to the HPSAM along with the Tag (unique id). All traces of the Tag/Array combination are deleted from the oPin Management Module (in particular from memory).
3. The Device App displays the oPinPad TIF (scrambled keypad) image on the device and gathers the oPin as described above; the oPin is immediately encrypted using a field encryption method (such as DUKPT). The whole authorization message is then sent to the Auth Client for payments authorization (this message includes the Amount, the encrypted card details and the encrypted oPin).
4. The Auth Client gathers the transaction details and passes it on to the Payments Switch.

| | |
|---|---|
| 5 | The Payments Switch intercepts the transaction during standard routing processing so that the oPin can be replaced with the Real Pin. This is done by sending the oPin with the Tag to the HPSAM. |
| 6 | Using the Tag, the HPSAM retrieves the oPinPad Array and uses it to map the oPin to the Real Pin. The Real Pin is immediately encrypted using 3DES and a ZMK which is aligned with the Payments Switch. |
| 7 | The Real Pin is sent back to the Payments Switch as a PinBlock and is added to the transaction to make an industry standard Online Pin payments authorization message (such as, for instance, an ATM message). |
| 8 | The Real Pin block is translated using an industry standard HSM such that the encrypted Pin can be handled by the receiving institution (Acquirer, Processor, Issuer). |

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

We claim:

1. A method comprising:
generating, by an electronic device and for display within a keypad zone of a screen associated with the electronic device, an operable keypad by a procedure or method call;
generating, by a remote server, a plurality of images of scrambled keypads;
removing, by the remote server and from the plurality of images of scrambled keypads, any image that represents a scrambled keypad having at least one key in a same position as a respective key of the operable keypad to provide a remaining plurality of images;
selecting, by the remote server and from the remaining plurality of images, an image of a scrambled keypad;
sending, from the remote server and for delivery to the electronic device the image of the scrambled keypad;
outputting, by the electronic device and for display at least partially within the keypad zone, at least a portion of the image of the scrambled keypad; and
receiving, at the electronic device, by operation of at least one key of the operable keypad via the image of the scrambled keypad, an identifier.

2. A method according to claim 1, wherein operation of at least one key of the operable keypad via the image of the scrambled keypad generates an encoded version of a user's intended input within the electronic device.

3. A method according to claim 1, wherein the image of the scrambled keypad is electronically formed, including a graphical image, an optical image, a video or some other form of visual representation of a scrambled keypad.

4. A method according to claim 1, wherein the keypad zone is a defined area or portion of the screen which covers a portion of the screen.

5. A method according to claim 1, wherein the image of the scrambled keypad is displayed within the keypad zone such that as a user touches, clicks on or otherwise selects a location within the image of the scrambled keypad, an operable keypad key of the operable keypad at that location within the keypad zone is activated to provide an encoded version of the user's input.

6. A method according to claim 1, wherein the image of the scrambled keypad is displayed such that the image of the scrambled keypad occupies the keypad zone exactly, completely or partially.

7. A method according to claim 1, wherein the image of the scrambled keypad is displayed such that the image of the scrambled keypad appears to the user as an operable keypad with keys in a scrambled order or configuration with respect to the operable keypad of the electronic device.

8. A method according to claim 1, wherein the image of the scrambled keypad functions as a mask or cover superimposed over the operable keypad such that a user's touching, clicking on or otherwise identifying a location within the image of the scrambled keypad operates the operable keypad key positioned at that location within the keypad zone.

9. A method according to claim 1, wherein the keypad zone is a portion of the screen which is designated, prior to input of the identifier, as a keypad display area.

10. A method according to claim 1, wherein the keypad zone and/or the image of the scrambled keypad remains in a fixed position on the screen during input of the identifier.

11. A method according to claim 1, wherein the identifier is a Personal Identification Code or Personal Identification Number.

12. A method according to claim 1, wherein the image of the scrambled keypad represents or depicts a scrambled keypad having at least one key which is positionally reordered or reconfigured relative to the layout of the keys in the operable keypad.

13. A method according to claim 1, wherein all of the keys depicted in the image of the scrambled keypad are repositioned or re-ordered relative to the keys in the operable keypad.

14. A method according to claim 1, wherein a user is enabled to input the identifier by interaction with the screen, such as by touching a portion of the screen and/or selecting an area of the screen using a pointing device such as a mouse or tracker ball.

15. A method according to claim 1, wherein the keypad zone comprises a plurality of sub-zones or 'hot spots', each sub-zone corresponding to a key of the operable keypad.

16. A method according to claim 15, wherein the image of the scrambled keypad is presented to the user such that a position of at least one key depicted in the image of the scrambled keypad corresponds to a position of a sub-zone, thus providing a mapping between the keys of the scrambled keypad depicted in the image and the plurality of sub-zones.

17. A method according to claim 1, wherein a configuration or an order of the keys in the operable keypad is altered after at least part of the identifier has been inputted.

18. A method according to claim 1, wherein an encoded version of a user's identifier is constructed within the electronic device from a plurality of keystrokes activated on the operable keypad in response to a click, touch or other indication made by the user in respect of the image of the scrambled keypad.

19. A method according to claim 1, wherein the identifier inputted into the device is sent from the electronic device to a remote computer-based resource.

20. A method according to claim 19, wherein the remote computer-based resource receives the inputted identifier and processes the identifier.

21. A method according to claim 20, wherein the identifier is processed using a stored form or version of a configuration of the keys depicted in the image of the scrambled keypad.

22. A method according to claim 21, wherein the stored form or version of the configuration of the keys is a filename.

23. A method according to claim 22, wherein processing involves using the stored form or version of the configuration of the keys to provide a decoded version of the inputted identifier.

24. A method according to claim 21, wherein the processed identifier is compared with a stored version of the identifier, and the inputted identifier is deemed to be verified when the processed identifier matches the stored version of the identifier.

25. A method according to claim 1, wherein respective positions of all keys depicted in the image of the scrambled keypad remain unchanged relative to one another during input of the user's identifier.

26. A method according to claim 1, wherein the symbol of at least one key in the image of the scrambled keypad is at least partially obscured or obfuscated but remains readable to the user.

27. A method according to claim 1, wherein the electronic device is a mobile telephone, a PC, a tablet computer, a laptop, a PDA, a card-reading terminal, or a mobile phone within a housing such that the mobile phone resembles a card-reading or electronic point of sale device, or some other electronic device having communications capabilities.

28. A method according to claim 1, wherein the image of the scrambled keypad is displayed via a web browser, or an application embedded within a browser, or a standalone software application, and/or an application providing a graphical user interface to allow a user to interact with the screen.

29. A method according to claim 1, wherein the procedure or method call also specifies the position of the keypad zone on the screen, and/or the dimensions of the keypad zone.

30. A method according to claim 1, wherein the image of the scrambled keypad and/or the keypad comprises numeric digits, alphabetical characters, symbols or any other indicia, or a combination thereof.

31. A method according to claim 1, wherein the image of the scrambled keypad is erased from the electronic device following a user's input, or following a specified period of time.

32. A method according to claim 1, wherein the inputted identifier is verified so as to control access to a resource such as a financial resource, a device, a building, an electronic resource, a medical resource, an information or data resource, or a computer-based resource.

33. A method according to claim 1, wherein the screen comprises a touch screen.

34. A system comprising:
a remote computer-based resource being configured to:
   generate a plurality of images of scrambled keypads;
   remove, from the plurality of images of scrambled keypads, any image that represents a scrambled keypad having at least one key in a same position as a respective key of an operable keypad of an electronic device to provide a remaining plurality of images;
   select, from the remaining plurality of images, an image of a scrambled keypad; and
   send, for delivery to an electronic device, the image of the scrambled keypad; and
the electronic device having a screen, a processor and associated memory, the electronic device being configured to:
display an operable keypad within a keypad zone of the screen, wherein the operable keypad is generated by a procedure or method call;
output for display, at least partially within the keypad zone of the screen, at least a portion of the image of the scrambled keypad; and
receive, store and/or process an identifier inputted into the electronic device by operation of at least one key of the operable keypad via the image of the scrambled keypad.

* * * * *